May 26, 1964 R. ULLMAN ETAL 3,134,161
COMPONENT HANDLING AND TIPPING MACHINE
Original Filed Oct. 2, 1956 18 Sheets-Sheet 12
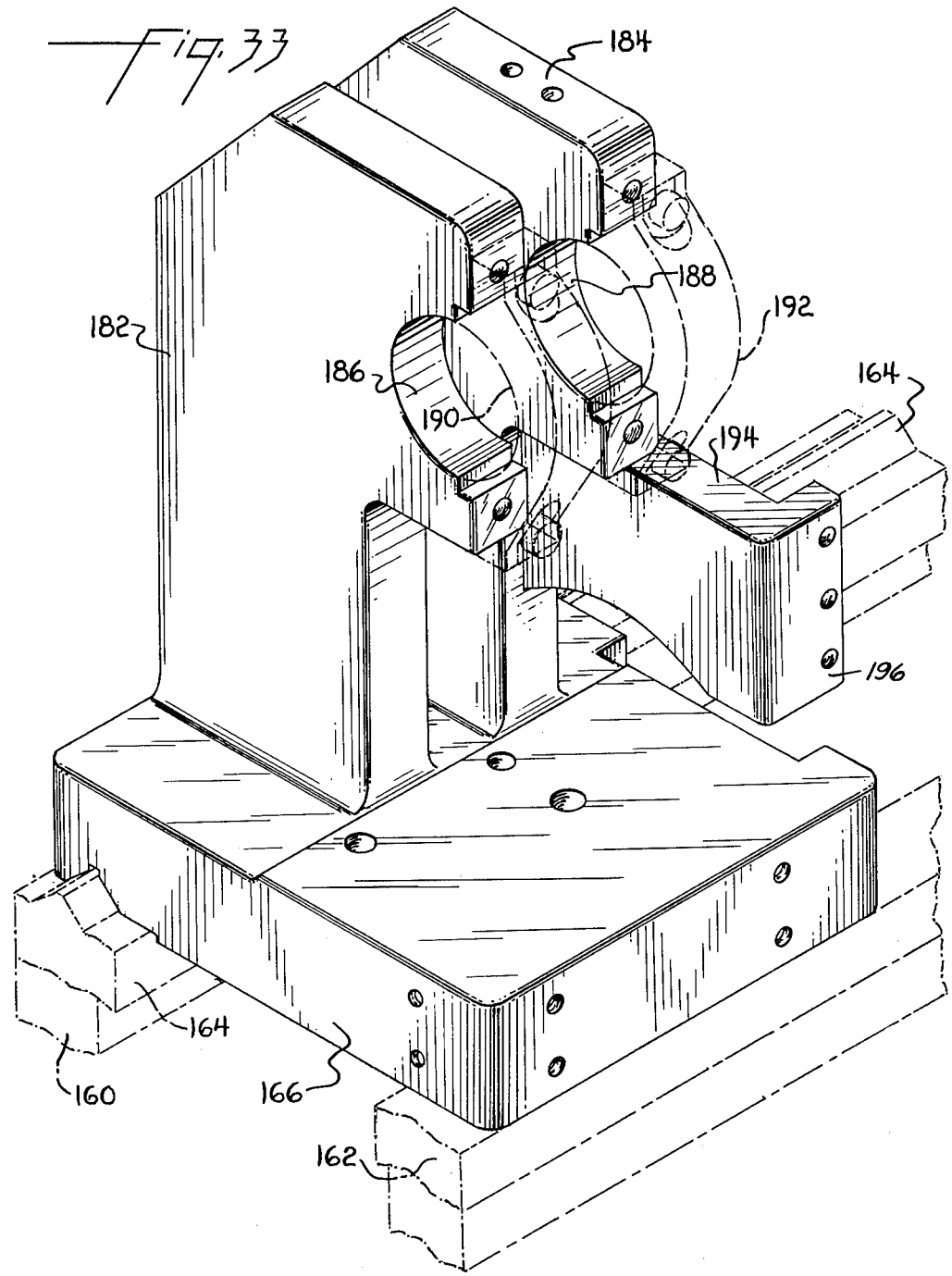

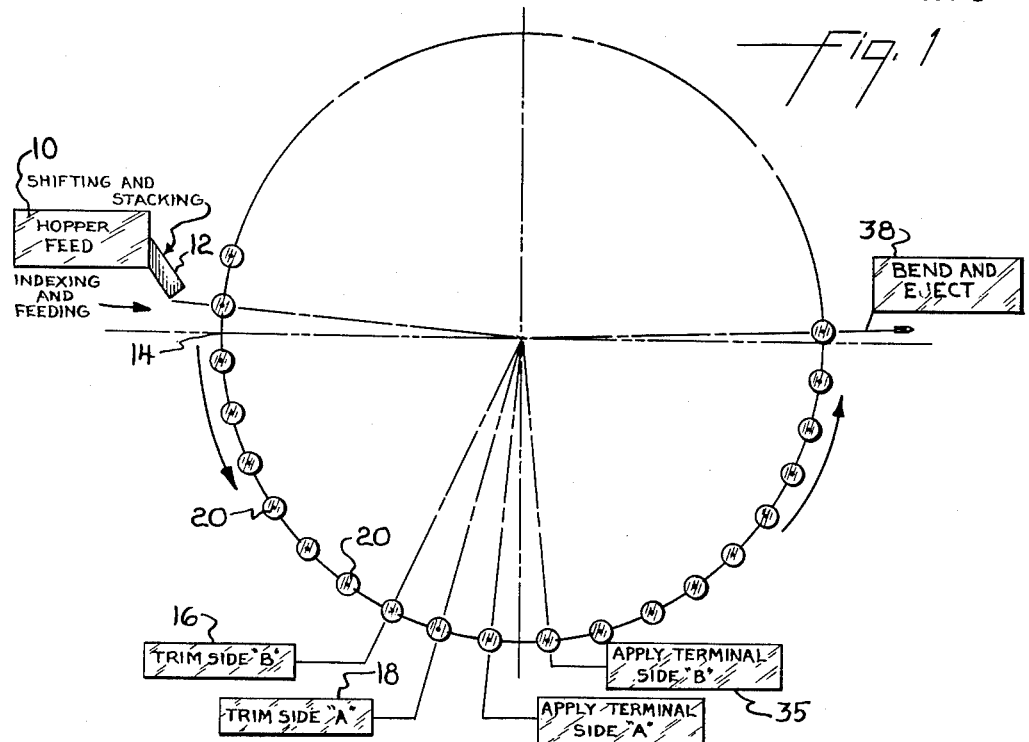
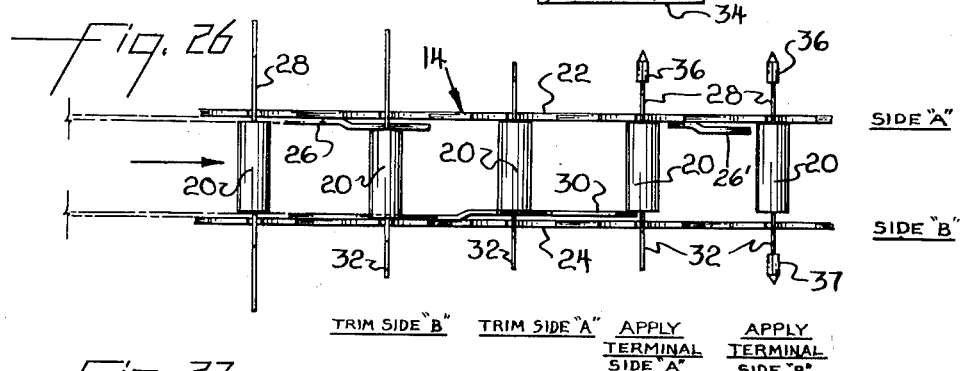
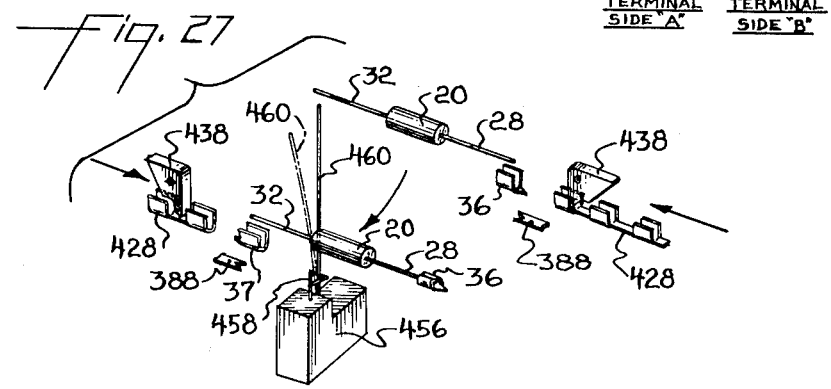

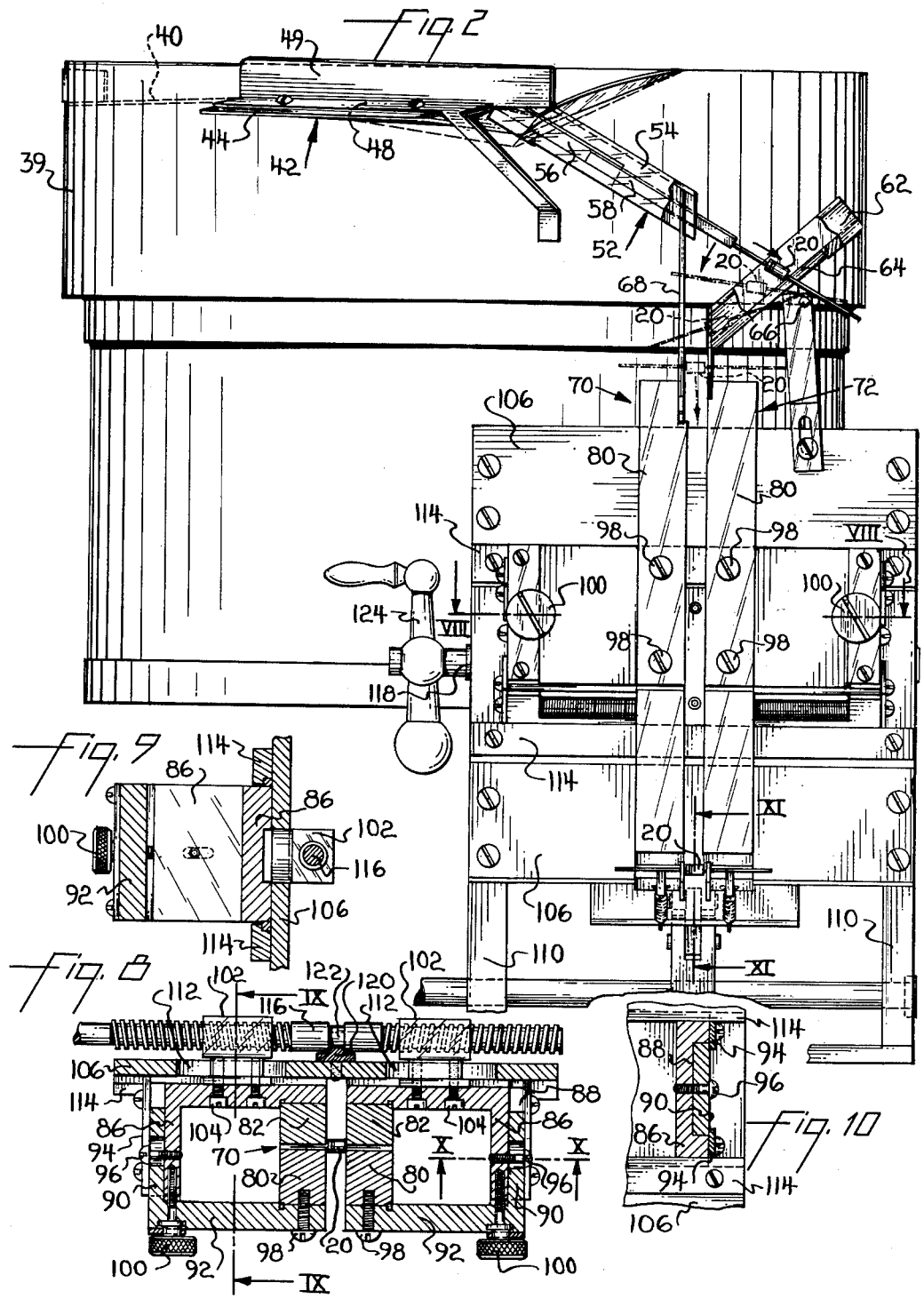

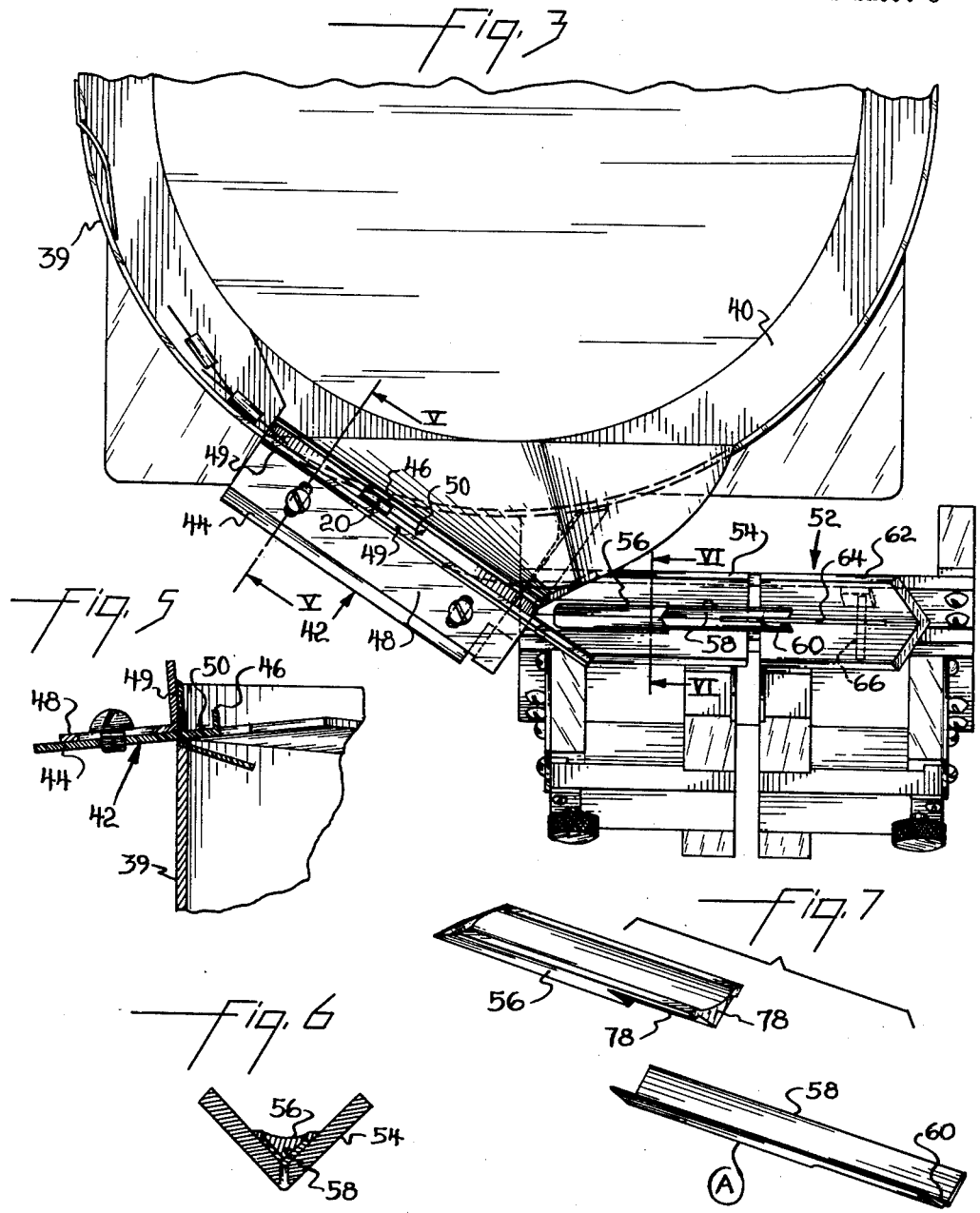

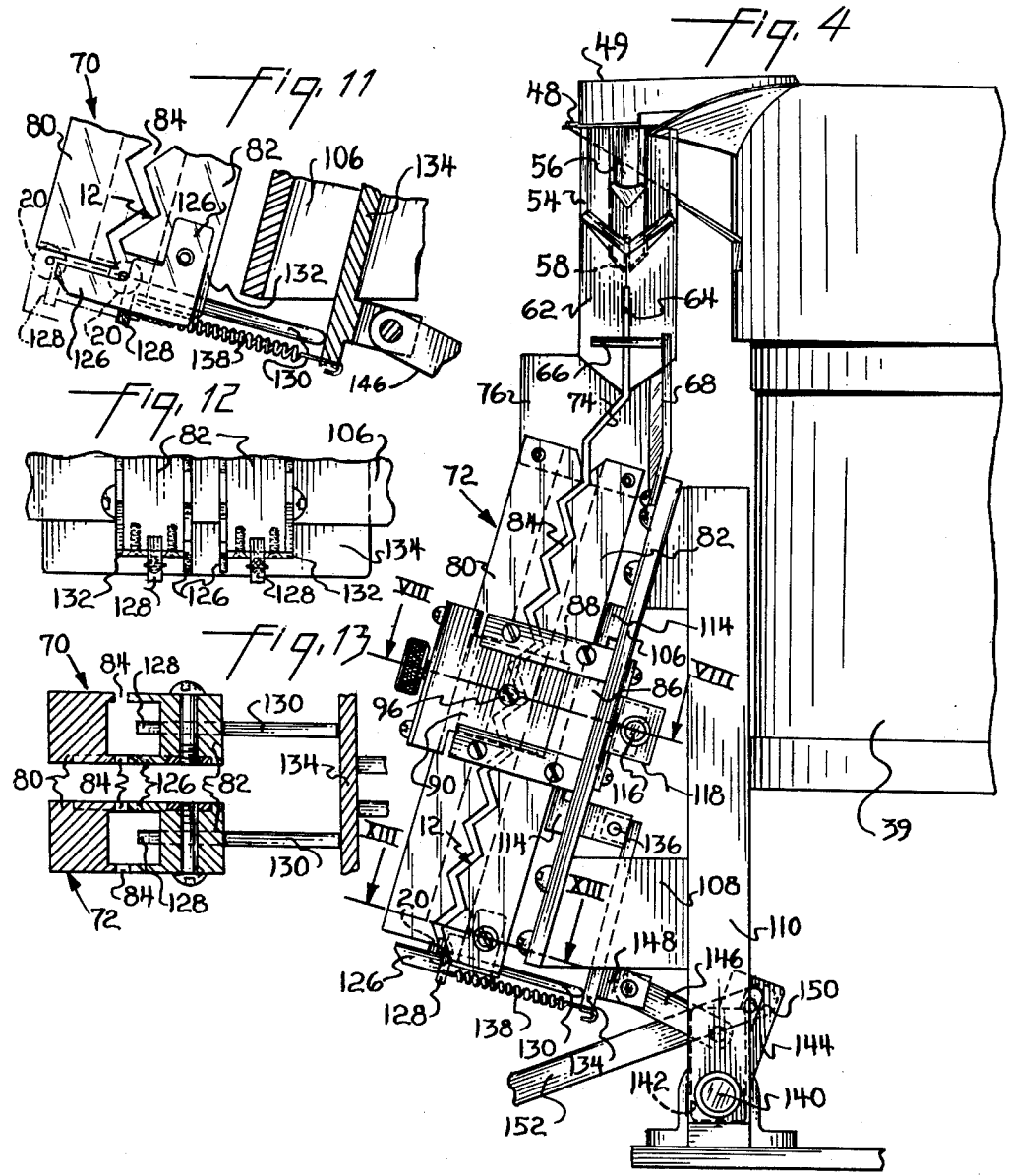

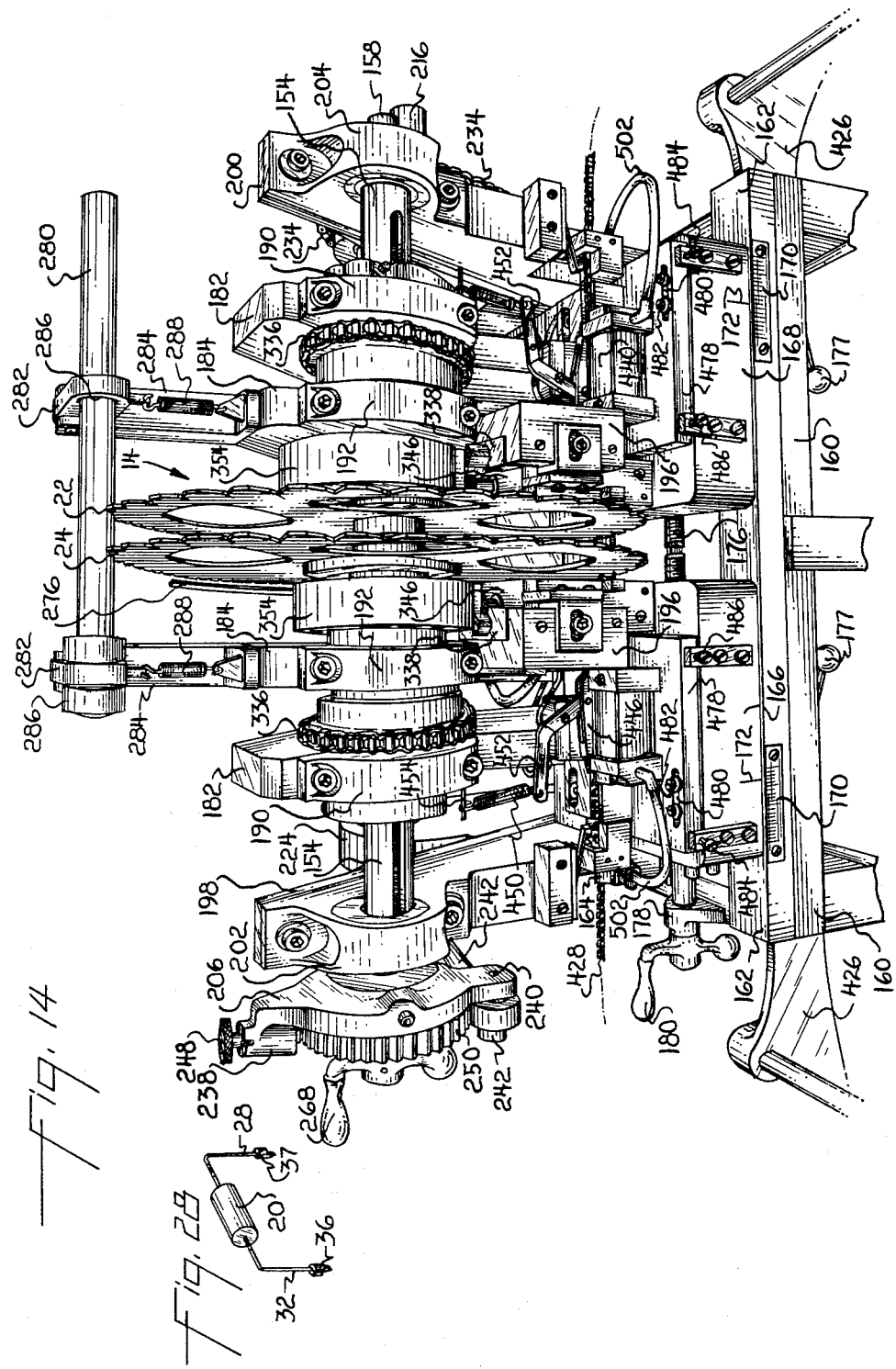

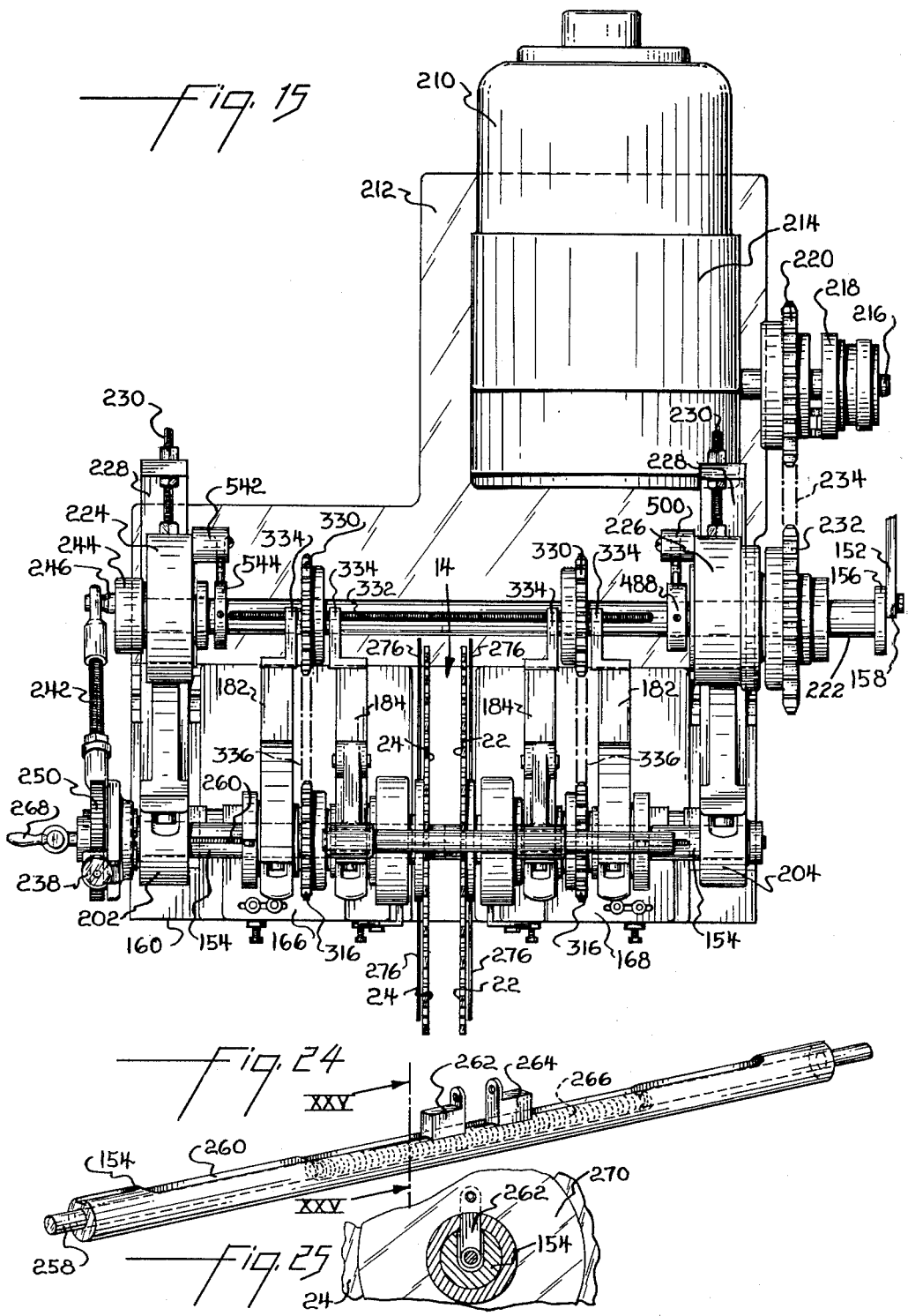

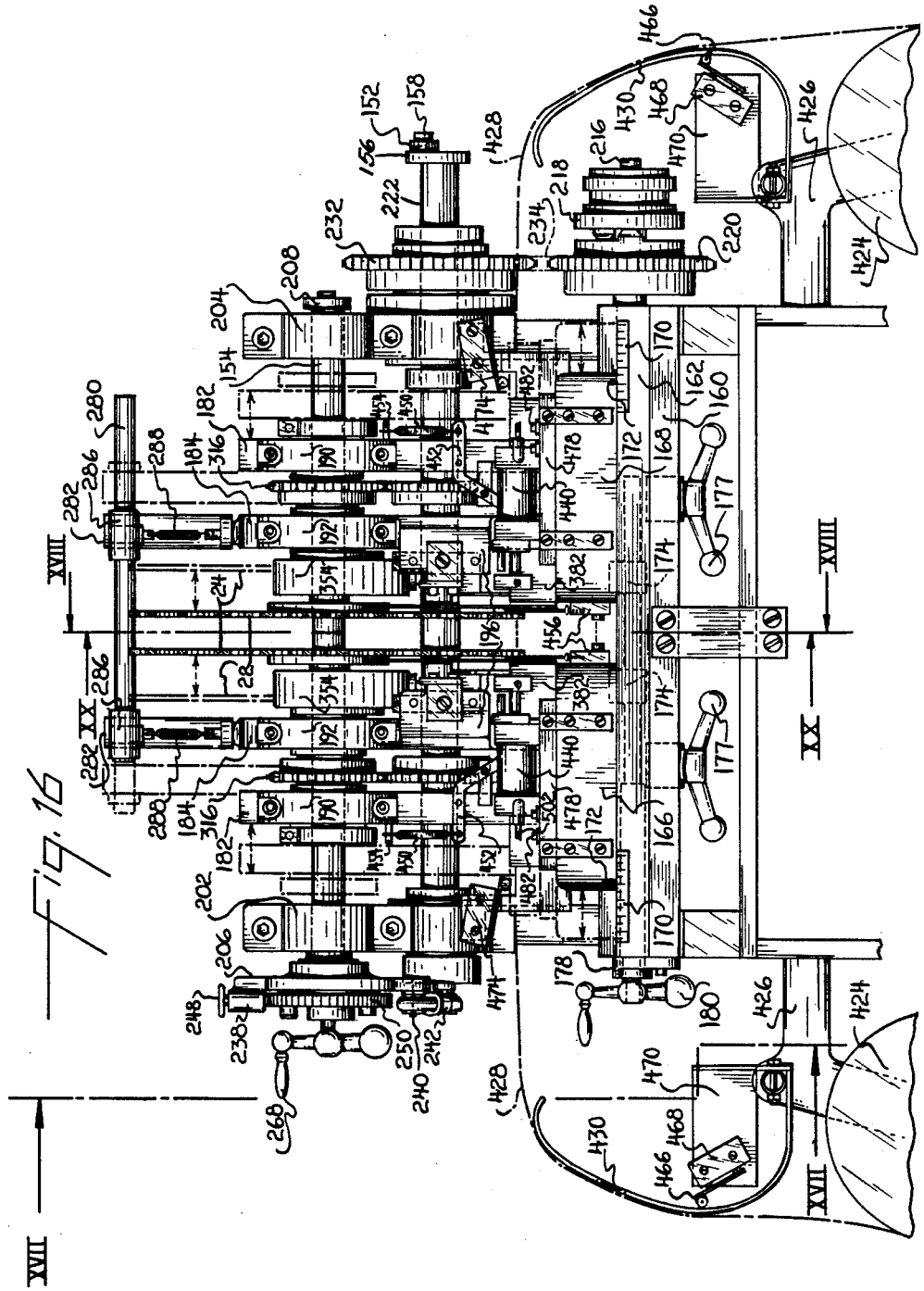

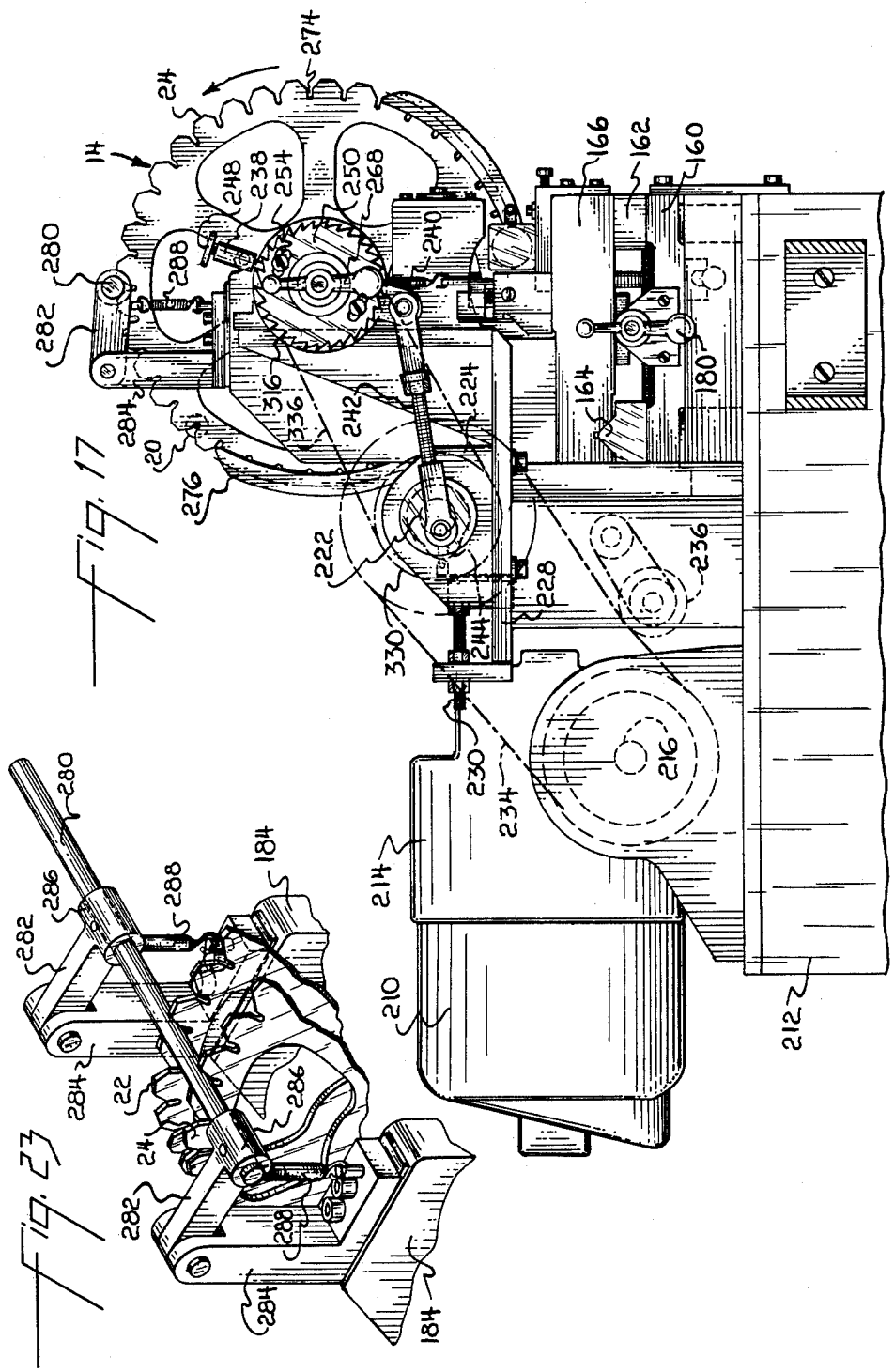

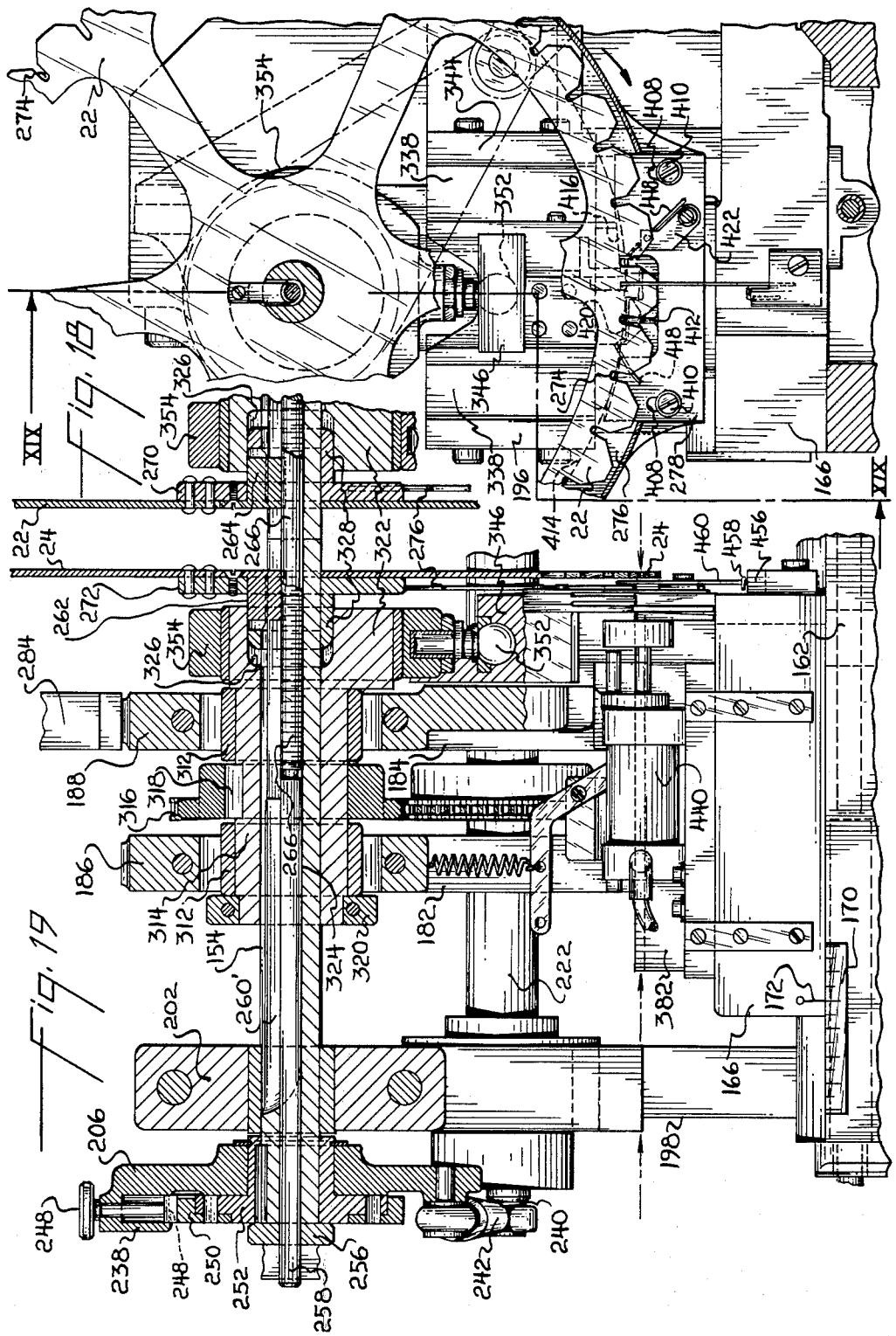

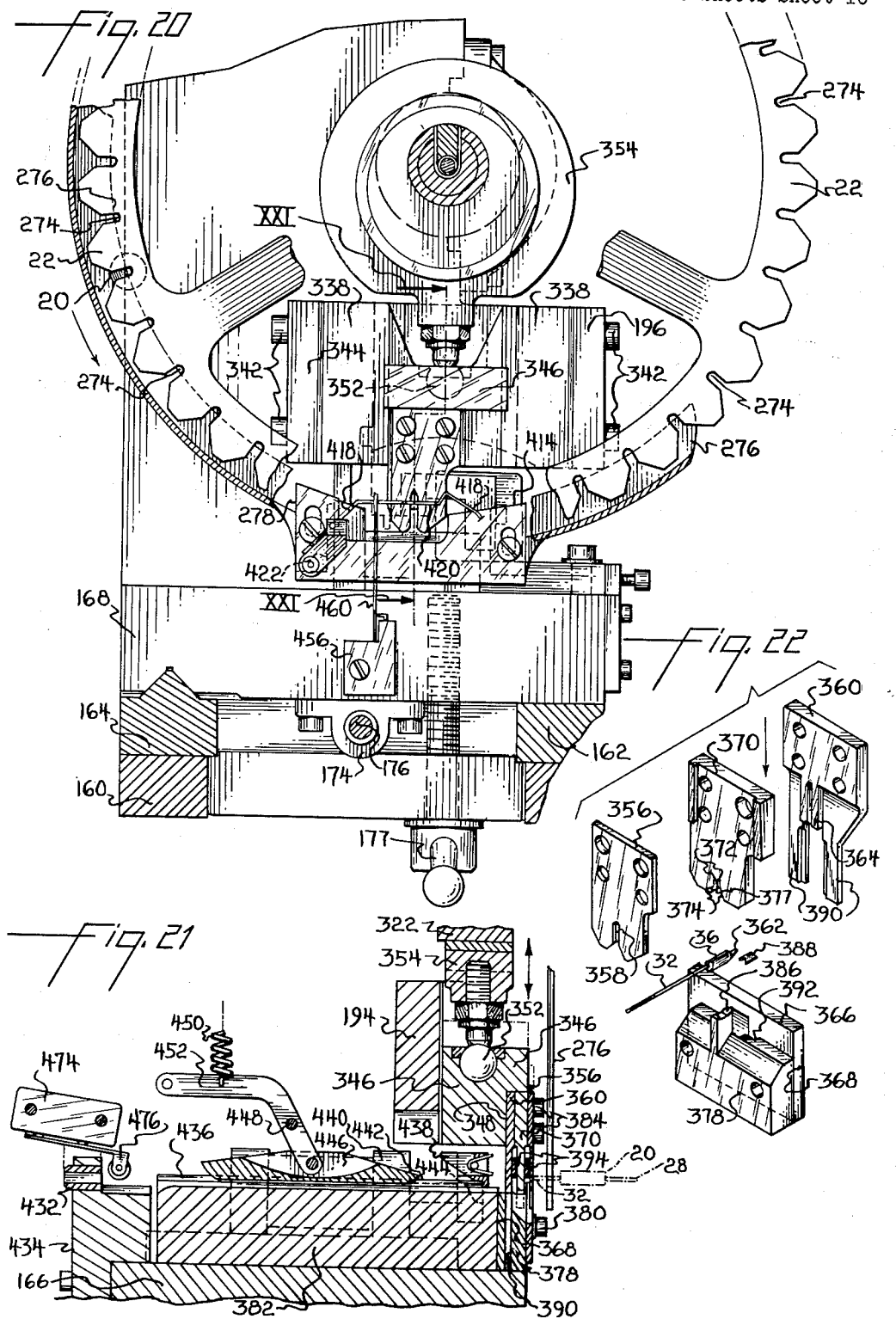
May 26, 1964　　R. ULLMAN ETAL　　3,134,161
COMPONENT HANDLING AND TIPPING MACHINE
Original Filed Oct. 2, 1956　　18 Sheets-Sheet 10

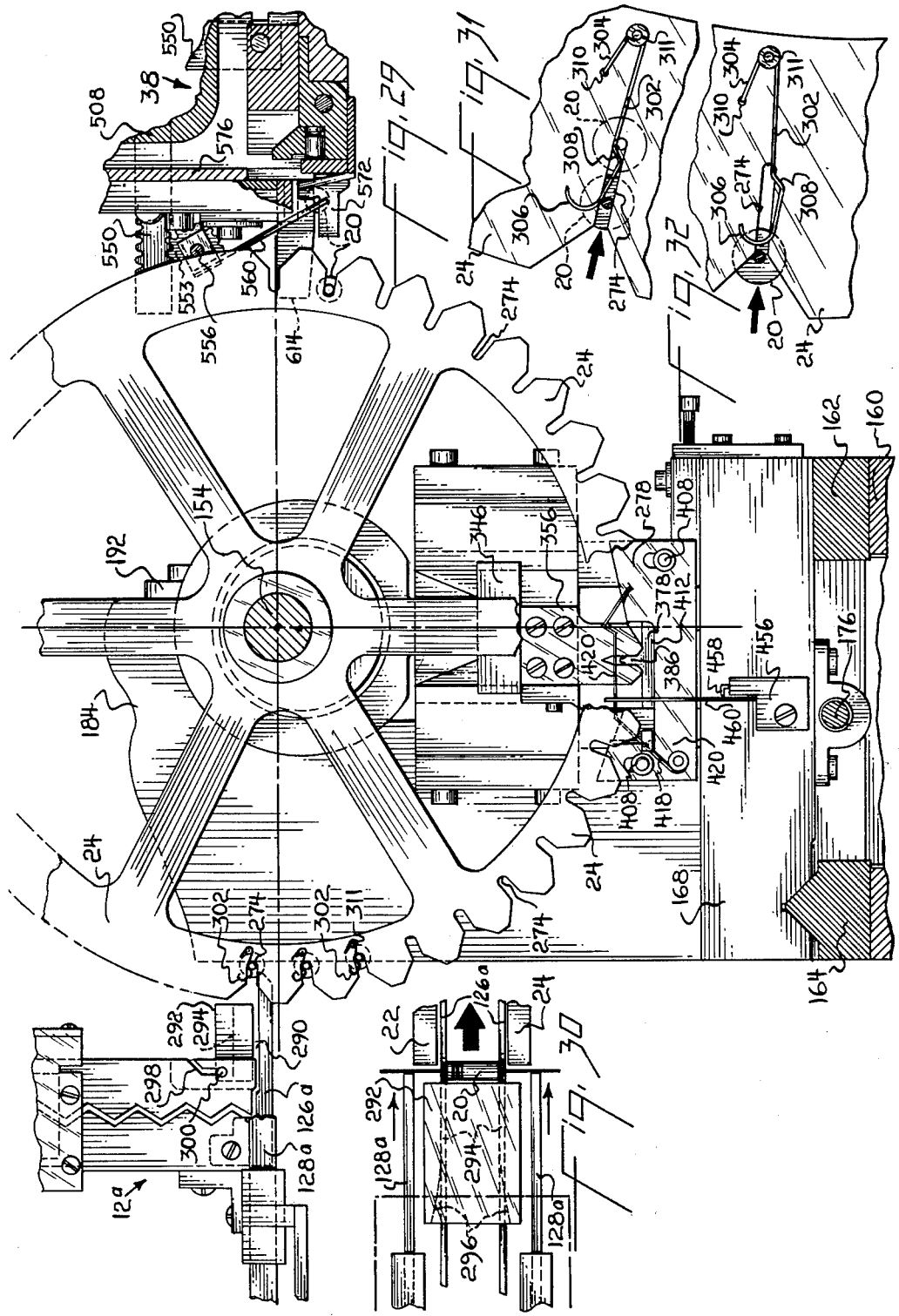

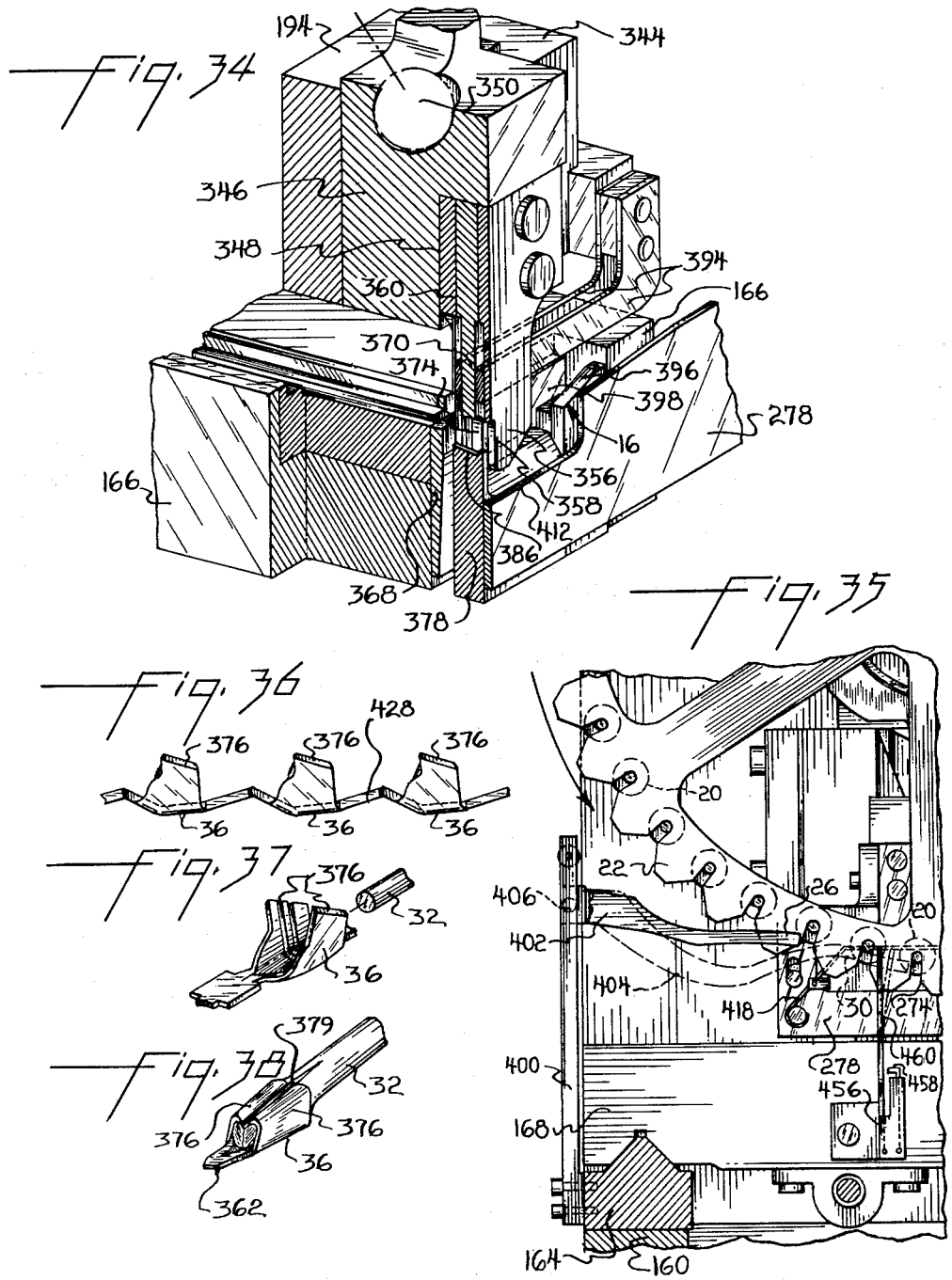

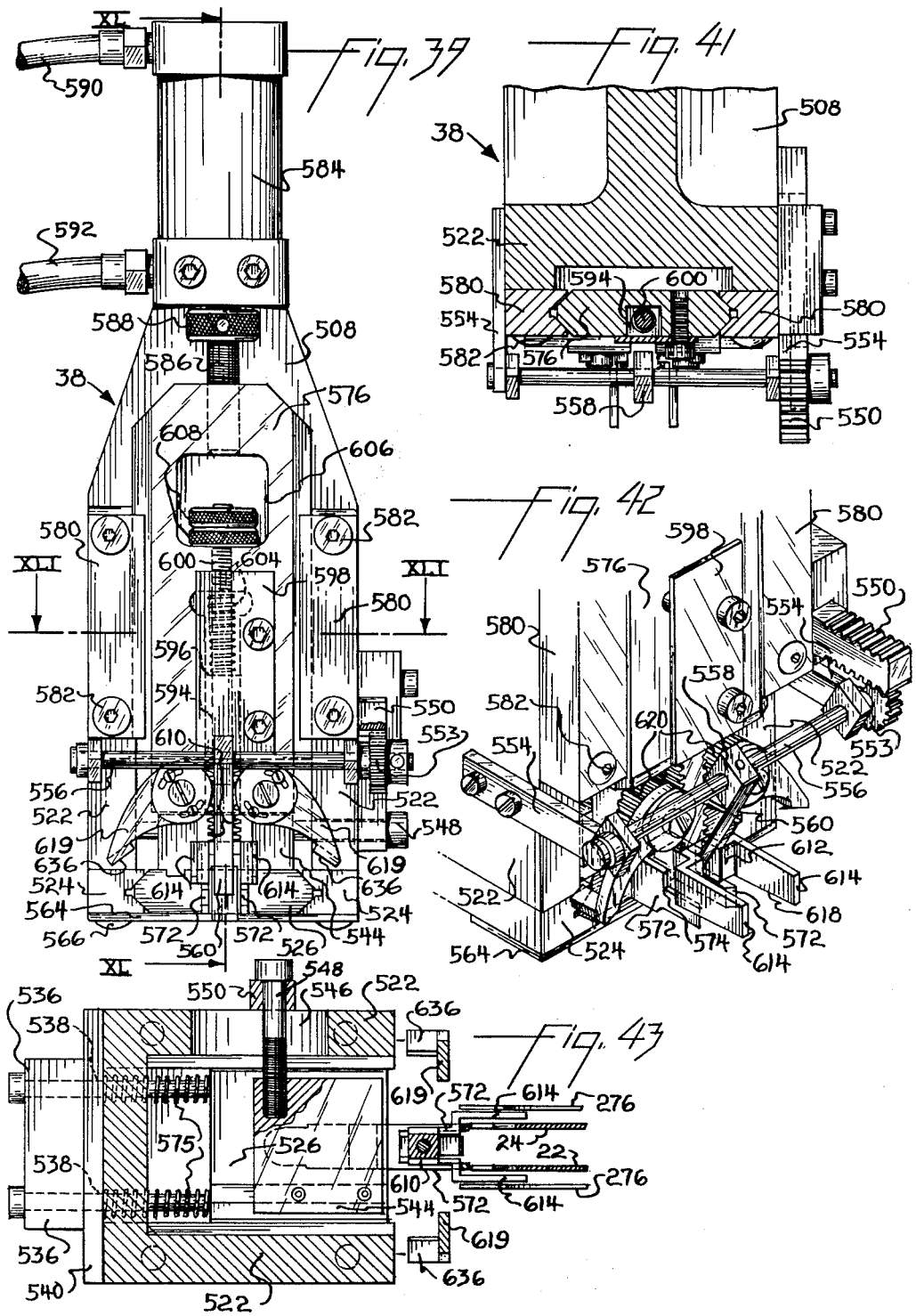

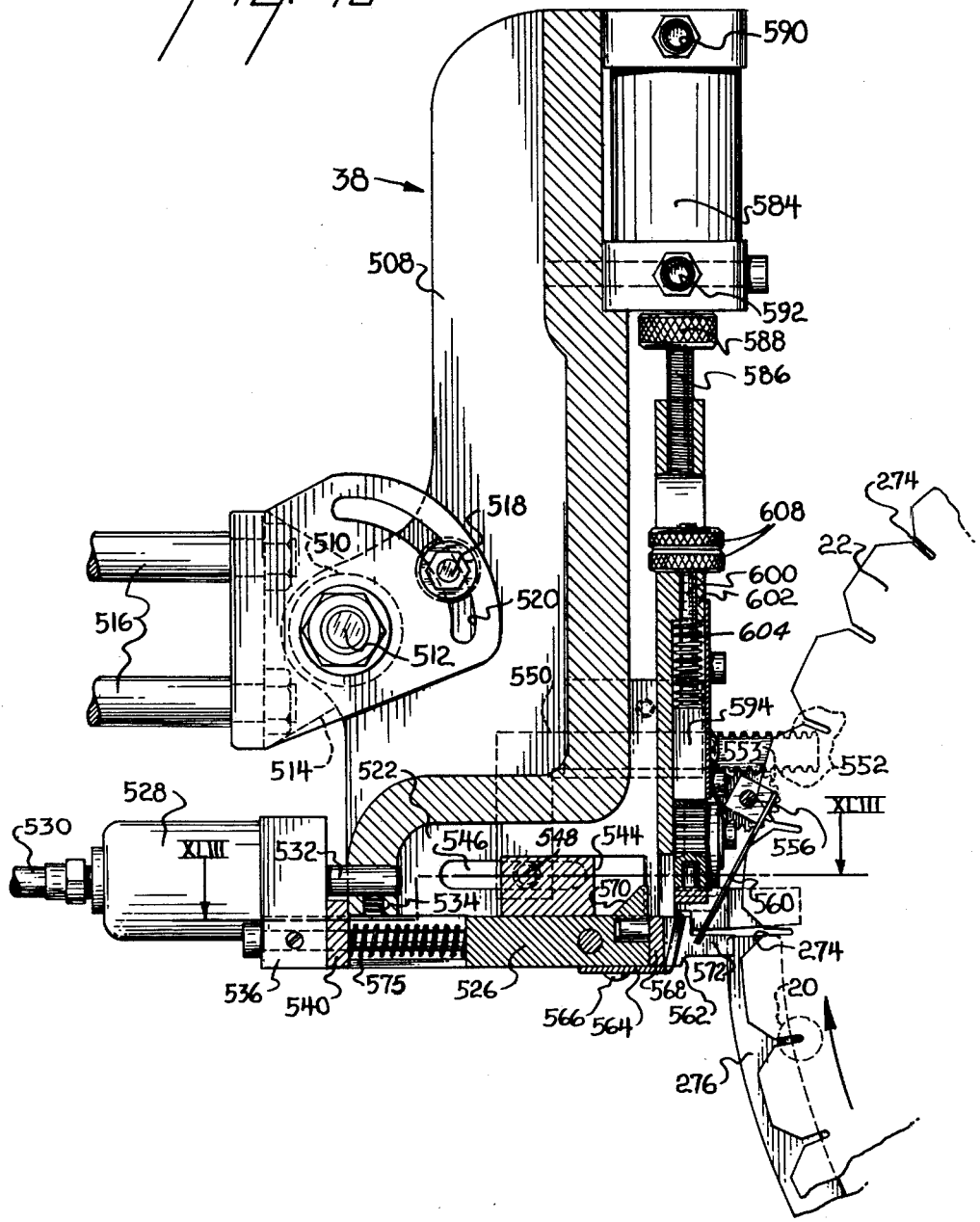

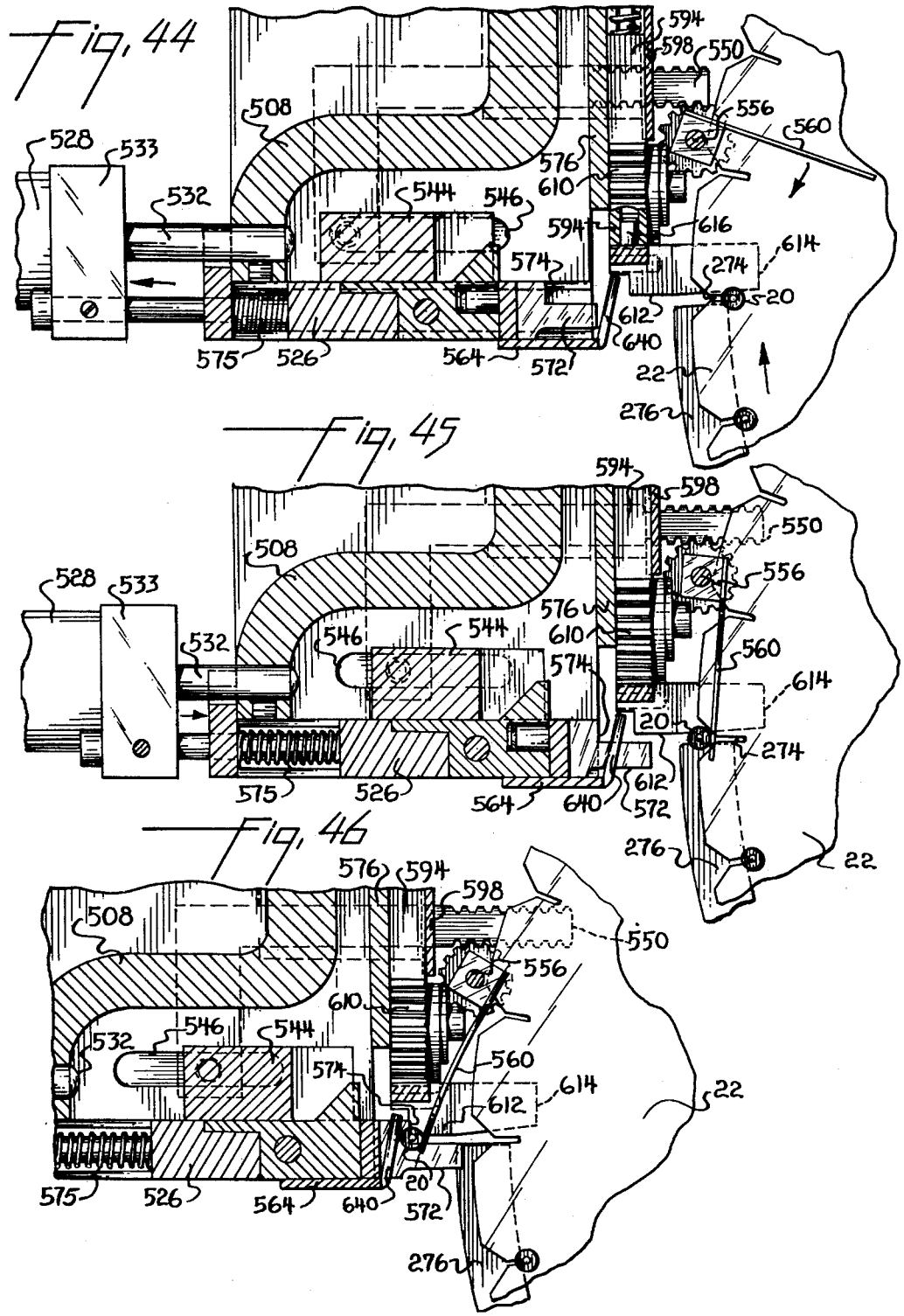

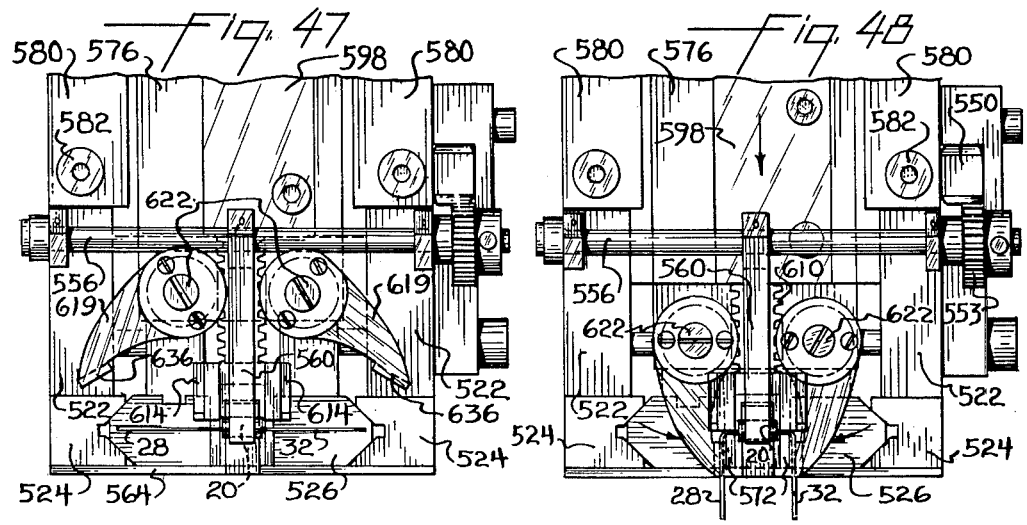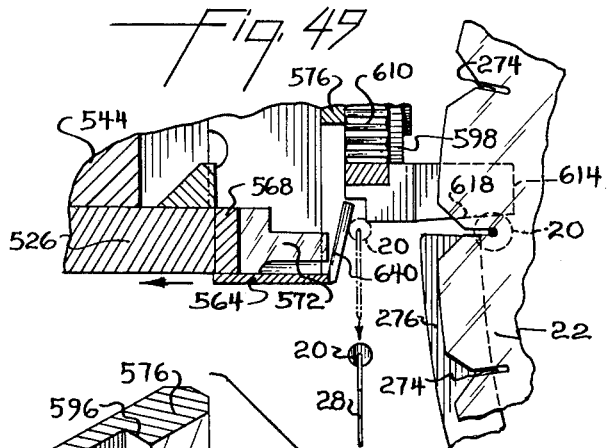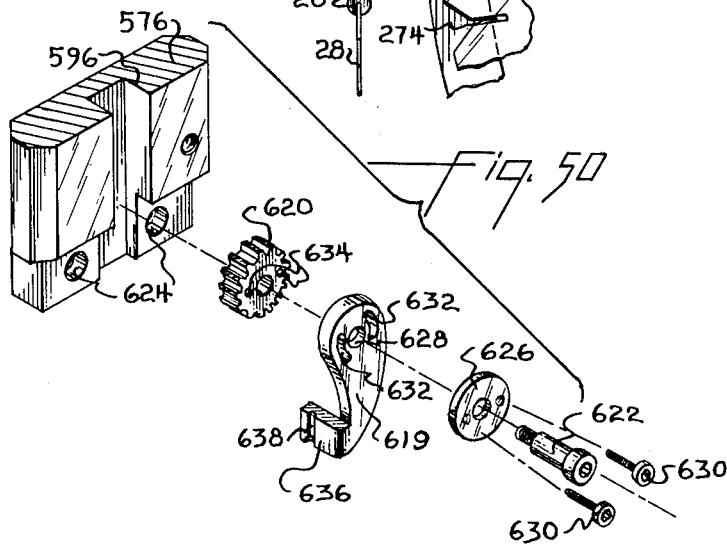

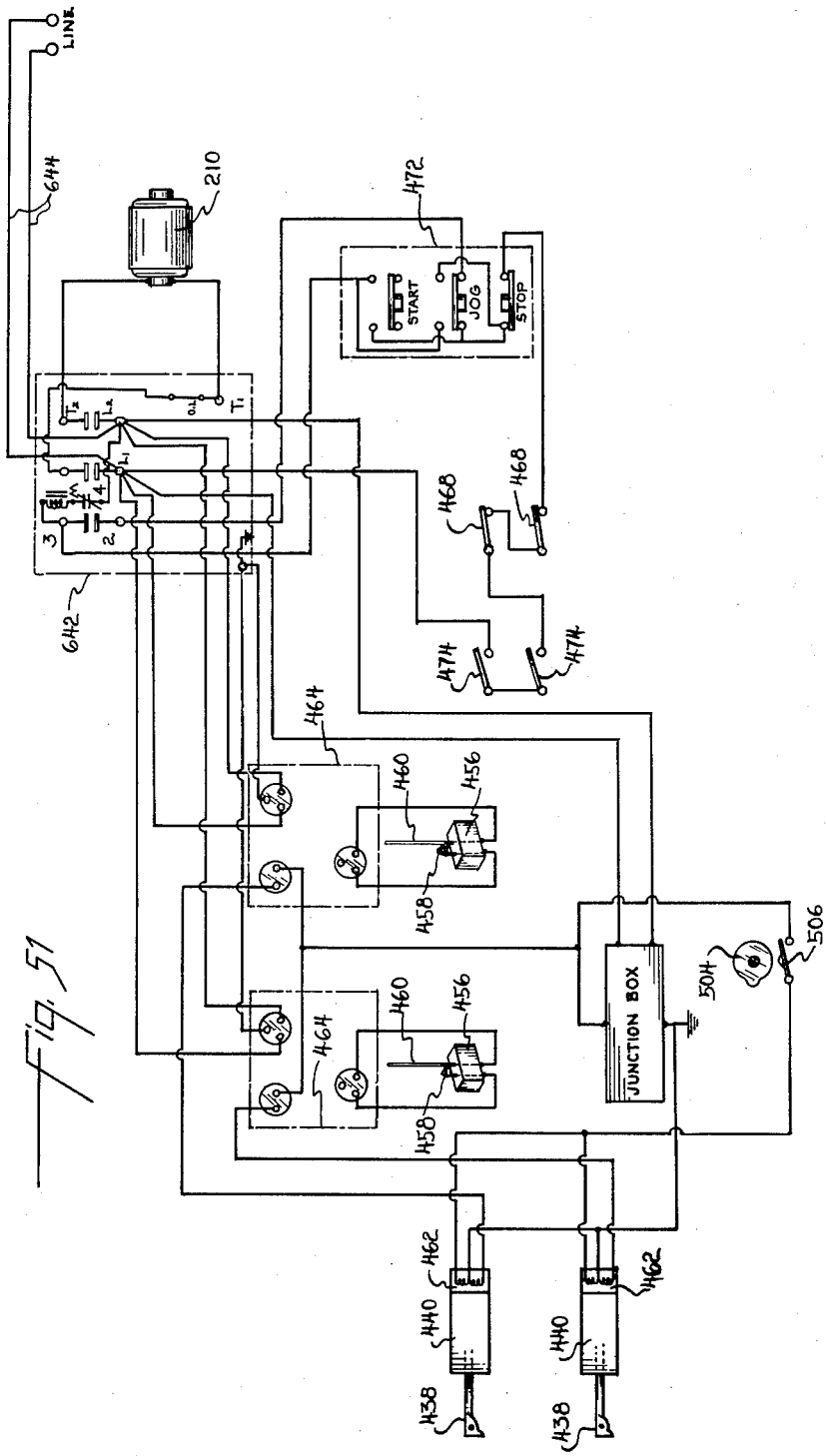

3,134,161
COMPONENT HANDLING AND TIPPING MACHINE

Robert Ullman, Harrisburg, Henry F. Fortna, Palmyra, John M. Middleton, Harrisburg, Glendon H. Schwalm, York, and Russell L. Tritt, Lemoyne, Pa., assignors to AMP Incorporated, a corporation of New Jersey
Original application Oct. 2, 1956, Ser. No. 613,416, now Patent No. 2,961,027, dated Nov. 22, 1960. Divided and this application Nov. 30, 1959, Ser. No. 4,847
10 Claims. (Cl. 29—33)

This invention relates to improvements in a component handling and tipping machine, and more particularly, to a machine designed and equipped with interrelated mechanism operable to receive electrical components each having a body and one or more leads projecting longitudinally respectively from opposite ends thereof, arranging said components for successive longitudinal feeding thereof to mechanism which trims one or both of said leads to a predetermined length, applies a terminal preferably to the outer end of one or both of said leads, and then shapes said leads by bending the same into predetermined configurations, whereupon said shaped components are in condition to be inserted into suitable electrical equipment such as a panel board provided with receptacle holes in circuit means into which the tipped leads of the electrical component are to be inserted. This application is a division of our prior copending application Serial No. 613,416, filed October 2, 1956, for Machine for Feeding and Applying Tips to a Series of Electrical Components now Patent No. 2,961,027 issued November 22, 1960.

Various types of electrical components are required for use in many types of electrical circuits at present and particularly electronic circuits of various kinds. The term "electrical component" or "component," as used hereinafter, is intended to embrace quite an extensive general class of electrical components including, for example, diodes, carbon resistors, pulse transformers, condensors, capacitors, and similar electrical items, each having the general, common characteristics of comprising a body, usually cylindrical, provided with one or more electrical leads such as wire members projecting longitudinally respectively from opposite ends of said body. Most, if not all, of said components have bodies including various kinds of electrical equipment which is sealed within said bodies. Further, these components usually generate a certain amount of heat during the operation thereof and it is preferable to mount said bodies upon a panel board or the like of an electric circuit so that said bodies are spaced from the panel board and thereby may be ventilated by ambient air much more efficiently than if said bodies merely were clamped directly against such panel board for example.

The bodies of such electrical components may be supported effectively from a panel board or the like if the leads projecting from opposite ends thereof are bent more or less at a right angle to the axis of the body, whereby the component has a substantially U-shaped configuration, the bent leads thereof actually comprising the supporting means for the components. Such components may be installed in an electrical circuit on a panel board having a printed circuit thereon, for example, by providing said panel board with receiving holes or sockets directly connected within the circuit, and terminals are applied to the outer ends of the leads of the components, either before or after bending the same. Such terminals have a firm metal-to-metal contact with the lead ends and afford a ready means for connecting such ends of the leads into the circuit by being received within the holes or sockets within the circuit referred to above.

Heretofore, the leads of such components usually have been bent by the use of hand operated tools but such manual operations are time consuming, and hence costly. The human element also enters the situation not only from the cost standpoint but also from the possibility of errors occurring. Thus, in an effort to reduce costs and insure the greater accuracy normally resulting from the use of automatic machinery, efforts have been made previously to provide certain types of machines to perform at least some of the more elementary operations required to produce a component having a terminal fixed to at least one lead thereof.

The complexity of handling and performing operations upon components of the type referred to, however, seriously has defied previous efforts to produce substantially automatic machines for feeding said components in desired order, trimming the leads to precise lengths, applying terminals to the ends of said leads, and shaping said leads into predetermined configurations. However, the constantly rising cost of man power has intensified such efforts and the present invention represents, in a single machine, interrelated mechanism capable of performing automatically all of the aforementioned functions to produce shaped components having terminals applied to the outer ends of the leads thereof without requiring any manual effort in such production.

The present invention comprises an exemplary machine including interrelated and sequentially operated portions which function in timed relationship respectively to receive a batch-type supply of similar components arranged at random, sort and feed said components for movement in longitudinal succession to means which arrange the same in stacked relationship one above the other for free movement into a stack wherein said components are substantially parallel to each other, sequentially deliver the endmost component in said stack to indexing mechanism which arranges the components in desired spaced relationship to each other for movement along a path and, in the course of such movement, the excess length of some or all of the leads projecting from the ends of the bodies of the components are trimmed accurately to desired length so as to produce leads of precise dimensions, after which terminals are affixed to the outer ends of one or both of said leads by multi-function die means which not only curl the terminals around the leads but also swage the same thereto and preferably produce a point on the outer end of each terminal which supplements an outwardly tapered shape into which the united terminal and lead is swaged to facilitate a firm physical contact of the terminals with sockets in the circuit board which receive the same; the components having terminals applied thereto then being moved to a portion of the machine which sequentially accepts the components and clamps the leads thereof to securely hold the components while the outer portions of some or all of the leads thereof are bent precisely into a predetermined configuration and the shaped components then are discharged from the machine.

Further, all portions of the above-described mechanism embodied in the present invention are adjustable so as to render the machine adaptable to sort, feed and stack components of uniform size selected from a relatively wide range of lengths and diameters of bodies and an extensive range of diameters and lengths of leads, the lead trimming and terminal applying portions of the machine are adjustable to permit the machine to trim the leads to a precise length within a substantial range of different lengths, and the portion of the machine which bends the leads into predetermined configuration also is adaptable to placing the bends in the leads at any desired location and thereby automatically produce an unlimited series of identically shaped components.

The supply of terminals for application to the leads of the components is effected by automatically operated means incorporated in the machine which sequentially feed, stepwise, a series of terminals connected in strip form which are delivered to the terminal applying means, the feeding of said strip of terminals being controlled by the timed arrival and positioning of a component at said applying means, whereby, if for any reason a misfeeding of the components occurs, the terminal applying mechanism will not jam or otherwise misfunction. Further, if the strip of terminals, which preferably is coiled upon a suitable reel, should become tangled, whereby the feeding thereof to the applying means is impeded, safety control means are provided which stop the operation of the entire machine. Additional similar control means also are provided for stopping the machine when the supply of terminals to one or the other of the applying means in the machine becomes exhausted.

The entire machine has been designed so as to be extremely compact and fool-proof in operation. The adjustment of the machine to handle components of a certain size of body and length of lead is accomplished readily and with a minimum of effort in the various portions of the machine which arrange and stack the components, index the components, trim the leads, apply the terminals, and bend the terminals to predetermined shape. All of the various portions of the machine which perform these functions operate in timed sequence relative to each other and are driven by interconnected actuating means, the operation of which is controlled by certain main control means as well as by safety control devices referred to above.

In general, as will be seen from the foregoing, the principal objectives of the present invention are to provide an automatically operable machine which will increase the production rate of components shaped as described above over that possible at present, insure uniformity in the products, and permit ready adjustment of all portions of the machine to operate upon components selected from a wide range of sizes of lengths and diameters of bodies and leads. Also, the unique type of swaging and shaping of the terminals and leads accomplished by the machine results in highly efficient mechanical connection of the terminals to the leads and of the terminals to the circuit boards, improved soldering conditions, and thereby avoids short circuit conditions in the completed products.

Although the invention primarily is adapted and arranged to operate upon components having bodies with terminals projecting longitudinally from opposite ends thereof, it is conceivable that a machine embodying the principles of the invention may be used to apply terminals to the ends of circuit wires, such as jumper wires, which are to be cut or trimmed to predetermined lengths and terminals applied to the ends of said wires for application of said wires to a circuit board for example.

Details of the invention and of an exemplary machine embodying the principles thereof, as well as the advantages and efficient operating characteristics of the machine, are set forth in the following specification and illustrated in the drawings accompanying the same and comprising a part thereof.

In the drawings:

FIGURE 1 is a schematic general layout of a machine embodying the basic principles of the invention and illustrating particularly the various stations at which components are handled or acted upon in various ways by the machine to form the desired product.

FIGURE 2 is a front elevation of that portion of the machine which arranges components from a random mass into an orderly stack from which they are delivered to an indexing means embodied in the machine.

FIGURE 3 is a plan view of the arranging means illustrated in FIGURE 2, only the forward portion of said means being illustrated in FIGURE 3.

FIGURE 4 is a side elevation of the means shown in FIGURE 3.

FIGURE 5 is a fragmentary sectional vertical elevation taken on the line 5—5 of FIGURE 3.

FIGURE 6 is a fragmentary vertical sectional view taken on the line 6—6 of FIGURE 3.

FIGURE 7 is an exploded perspective view showing two relatively adjustable elements comprising guide chutes and embodied in the arranging mechanism illustrated in FIGURES 2 through 4.

FIGURE 8 is a horizontal sectional view of part of the mechanism shown in FIGURE 4 and taken on the line 8—8 of said figure.

FIGURE 9 is a vertical sectional view taken on the line 9—9 of FIGURE 8 to illustrate certain details of the mechanism shown in FIGURE 8.

FIGURE 10 is a vertical sectional view taken on the line 10—10 of FIGURE 8 for purposes of illustrating further details of the mechanism shown in FIGURE 8.

FIGURE 11 is a fragmentary vertical sectional view taken on the line 11—11 of FIGURE 2 and illustrates details of means for discharging components from the lower end of a stack thereof in the arranging mechanism shown in FIGURE 2.

FIGURE 12 is a vertical sectional view taken on the line 12—12 of FIGURE 11 and illustrating details of the discharge mechanism shown in the latter figure.

FIGURE 13 is a horizontal sectional view taken on the line 13—13 of FIGURE 4 and illustrating still further details of the discharge mechanism.

FIGURE 14 is a front perspective view of that portion of the machine which embodies the indexing means, terminal feeding and applying means, and the principal supporting mechanism for said means; the component stacking and lead bending means of the machine being omitted to simplify the view.

FIGURE 15 is a plan view of that portion of the machine which is illustrated in FIGURE 14.

FIGURE 16 is a front elevational view of that portion of the machine which is illustrated in FIGURE 14.

FIGURE 17 is a side elevation of that portion of the machine which is illustrated in FIGURE 14.

FIGURE 18 is a vertical sectional view taken on the line 18—18 of FIGURE 16 but illustrating on a larger scale than in the latter figure certain details of the component indexing means, and portions of the terminal applying means and control means therefor, parts of the elements of the mechanism being broken away to foreshorten the view.

FIGURE 19 is a vertical sectional view taken at a right angle to the view in FIGURE 18 and shown on the line 19—19 of FIGURE 18.

FIGURE 20 is a vertical elevation opposite to that shown in FIGURE 18 as seen from the line 20—20 of FIGURE 16.

FIGURE 21 is a fragmentary vertical sectional view taken generally along the line 21—21 of FIGURE 20 and showing details of the terminal feeding and applying portions of the machine.

FIGURE 22 is an exploded perspective view of a composite terminal applying die and the anvil structure which cooperates therewith.

FIGURE 23 is a fragmentary perspective view of the index mechanism and illustrates means for releasably holding the indexing mechanism periodically at various positions of advancement thereof.

FIGURE 24 is a perspective elevation of shaft means for supporting and adjusting the index wheels of the indexing mechanism.

FIGURE 25 is a fragmentary vertical sectional view taken on the line 25—25 of FIGURE 24.

FIGURE 26 is a diagrammatic plan view of a series of components being moved along a predetermined path by the indexing wheels of the mechanism and illustrating the various positions of the components as they are moved successively to the several trimming mechanisms for the leads and the terminal applying units of the machine.

FIGURE 27 is a perspective exploded view illustrating schematically the arrangement of the several terminal feeding and applying portions of the machine in relation to components being fed thereto, and control means actuated by said components.

FIGURE 28 is a perspective view of an exemplary component to which terminals have been applied to the ends of the leads and the leads have been bent to predetermined shape, said component representing a completed product as produced by the entire machine comprising the present invention.

FIGURE 29 is a vertical sectional view similar to FIGURE 20 but showing another embodiment of means for releasably retaining the components in the index wheels and also a slightly different embodiment of stacking means and mechanism for delivering components from said stacking means to the indexing wheels, the terminal bending portion of the mechanism also being shown in a modified relationship to said index wheels.

FIGURE 30 is a top plan view of the means illustrated in FIGURE 29 for delivering terminals from the stacking mechanism to the index wheels, this view illustrating only fragmentarily certain portions of the means.

FIGURE 31 is a fragmentary enlarged side elevation of the embodiment of component retaining means illustrated in FIGURE 29 and shows an exemplary component positioned in two different positions in the indexing notches of the index wheels.

FIGURE 32 is a view similar to FIGURE 31 but shows the position occupied by the various elements of the mechanism prior to the leads of the component engaging the retaining springs.

FIGURE 33 is a perspective view, on an enlarged scale, showing one of the sub-bases of the machine and the bearing means fixedly carried thereby.

FIGURE 34 is a fragmentary perspective view of one of the sub-bases of the machine and shows in vertical one of the reciprocating compound die units of the terminal applying mechanism and the lead trimming mechanism.

FIGURE 35 is a fragmentary vertical sectional view showing principally the supporting means for certain of the component positioning means illustrated in FIGURES 20, 27 and 29.

FIGURE 36 is an enlarged side view of a section of a strip of connected terminals capable of being utilized in the present machine for application to the leads of components.

FIGURE 37 is a fragmentary perspective view of one of the terminals shown in FIGURE 36 in position to receive the end of one of the leads of a component.

FIGURE 38 is a perspective fragmentary view of one end of a lead of a component to which an exemplary terminal has been applied, this view showing the completed form of the united component lead and terminal.

FIGURE 39 is an elevation of that portion of the machine which bends the leads of components to a predetermined shape, this view illustrating said portion of the machine as seen from the index wheel side thereof.

FIGURE 40 is a vertical sectional view of the portion of the machine shown in FIGURE 39 as seen on the line 40—40 of the latter figure.

FIGURE 41 is a horizontal sectional view of the lead bending portion of the machine as seen on the line 41—41 of FIGURE 39.

FIGURE 42 is a perspective fragmentary view illustrating particularly the component clamping mechanism and transfer means which moves components from the index wheels to said clamping mechanism.

FIGURE 43 is a horizontal sectional view taken on the line 43—43 of FIGURE 40 and illustrating particularly the supporting and operating means for the bending anvil.

FIGURES 44, 45, and 46, respectively, show enlarged vertical sectional views fragmentarily illustrating respectively successive positions of the component transfer mechanism as it moves through its entire cycle of operation.

FIGURE 47 is a front elevation of the lower part of that portion of the bending mechanism which is illustrated in FIGURE 39 but showing the same on a larger scale, the bending arms being illustrated in this view in inoperative position.

FIGURE 48 is a view similar to FIGURE 47 but showing the bending arms at the completion of the lead-bending operation.

FIGURE 49 is a fragmentary sectional view similar to FIGURE 46 but showing the bending anvil in fully retracted position so as to discharge a shaped component from the machine.

FIGURE 50 is an exploded perspective view fragmentarily illustrating a portion of the supporting means for one of the bending arms and the various elements which support the same.

FIGURE 51 is an exemplary circuit diagram illustrating the various power and control means for the machine connected by suitable power conductors.

The component handling and tipping machine comprising the present invention and embodying the principles thereof is capable of receiving in a suitable hopper or other container a random mass of electrical components or similar articles and particularly components each having a substantially cylindrical body of predetermined length, wire leads or the like projecting longitudinally from opposite ends thereof. If desired, however, the components may be fed to the machine in other ways, such as by hand. The machine also is not restricted to operation upon components having only a single lead projecting from opposite ends of the body of the components inasmuch as components having several leads projecting from one or both ends thereof may be handled by the machine within the purview of the present invention. Commonly used components which the machine is capable of handling include diodes, or diode tubes, carbon resistors, pulse transformers, condensers, capacitors, and other similar components, but it is to be understood that the machine is not to be restricted to handling these specifically enumerated components inasmuch as other electrical components and similarly shaped articles may be handled by the machine.

The entire machine embraces an extensive amount of compactly arranged elements and mechanisms which will be described in detail hereinafter. To facilitate the overall concept of the machine and its functions, various portions thereof which lend themselves to being segregated in the following description are described under appropriate headings. As to the overall operation, however, a diagrammatic view shown in FIGURE 1 is included to afford an initial general concept of all functions of the machine.

Referring to FIGURE 1, a diagrammatic exemplary unit 10, labeled "Hopper Feed" comprises, generally, arranging mechanism which includes a hopper capable of receiving, preferably, a substantial supply of electrical components, arranged at random, and means for sorting and arranging said components for sequential feeding thereof longitudinally to a shifting and stacking mechanism 12. The latter mechanism shifts the components from a longitudinal sequence into an arrangement wherein the components are disposed one above the other and parallel to each other.

The foregoing arrangement of the components within the mechanism 12 comprises a stack from which the lowermost component is delivered in timed sequence to the movement of an indexing and feeding mechanism 14 which, in the exemplary embodiment of the invention illustrated in succeeding figures in the drawings, comprises a pair of index wheels having circumferentially spaced, radially extending notches which respectively receive the leads of the components as delivered to the wheels from the shifting and stacking mechanism 12. The index wheels hold the components so that they extend transversely to the planes of the wheels and the components are held within the notches of the wheels for stepwise movement along a predetermined path in longitudinally spaced relationship to each other.

As manufactured, components of the type referred to usually are provided with leads having excessive length in order that said leads may be cut or trimmed to a precise length prior to the application of terminals to said trimmed ends of the leads. Accordingly, the present machine embodies lead trimming mechanism or units 16 and 18 which respectively are positioned adjacent the outer surfaces of the index wheels of mechanism 14 and said trimming units are also positioned in longitudinally spaced relationship to each other along the path traversed by the components. By such an arrangement, and particularly by referring to FIGURE 26 which illustrates, diagrammatically, a series of components held by the wheels of indexing mechanism 14, it will be seen that the components 20 initially are positioned between the index wheels 22 and 24 substantially centrally thereof as seen at the left-hand end of FIGURE 26.

Prior to a component reaching trimming unit 16, a suitable positioning blade 26, mounted stationarily upon the machine, engages one end of the component 20 in order to shift the lower end thereof, as viewed in FIGURE 26, against the inner surface of index wheel 24. Said component then is in position to have the lowermost lead 32 trimmed by the trimming unit 16 to precise length. Said component then is engaged, during its movement to trimming unit 18, by a second positioning blade 30 so as to move the opposite end of the component against the inner surface of index wheel 22 as shown in FIGURE 26. Said component then is in position for the opposite lead 28 to be trimmed or cut to precise length by trimming unit 18.

The component 20 which now has had both of its leads trimmed to precise length, next moves to the first of two terminal applying means or units 34 and 35 which also respectively are positioned adjacent but laterally from the outer surfaces of the opposite index wheels 22 and 24, these terminal applying means also being spaced longitudinally along the path of movement of the components from the second trimming unit 18, as is shown in FIGURE 1. The terminal applying units 34 and 35 also are longitudinally spaced along said path of movement of the components relative to each other as is also indicated diagrammatically in FIGURE 1.

The first terminal applying unit 34 applies a first terminal 36 to the trimmed end of the lead 28 while the component 20 is held by blade 30 positioned against the inner surface of index wheel 22. In accordance with the preferred operation of the machine, the application of the terminals includes a swaging operation which tends to elongate the terminal from its initial condition, such swaging resulting in the forcing of the component 20 longitudinally of its axis and in a direction transverse to the planes of the index wheels 22 and 24. Hence, the index wheels preferably are spaced apart a distance slightly greater than the length of the body of each of the components received therebetween in order that such swaging and transverse movement of the components may take place without damage to the leads. Otherwise possible buckling of the leads may occur.

Following the application of the first terminal 36 to the lead 28, and the incidental swaging of the terminal having moved the opposite end of the body adjacent or against the inner surface of index wheel 24, a second terminal 37 is applied to the trimmed outer end of lead 32 by the second terminal applying unit 35. Following the application of the terminals 36 and 37 to the ends of the leads of each component 20, the indexing and feeding mechanism 14 moves the components to a bending and ejecting mechanism or unit 38.

Said bending and ejecting unit engages the leads of the components and clamps the same securely while additional means engage the projecting ends of the leads and bends the same into predetermined configuration in order that the shaped component will resemble, for example, the component illustrated in FIGURE 28 and in which condition said component is ready for easy insertion of the terminals 36 and 37 into suitable holes formed, for example, in a panel board having circuit means thereon in regard to which the component 20 is to become an item in the circuit. In accordance with the preferred operation of the machine comprising the present invention, the terminals 36 and 37, when applied to the trimmed ends of the leads 28 and 32 are swaged so as to be tapered outwardly, as shown for example in FIGURE 38, the outer ends of said terminals also being provided with projecting points readily illustrated in the latter figure. Such arrangement affords ready and firm physical contact between the terminals and the walls of the holes in a circuit board into which the terminals are inserted, as well as metal-to-metal contact between the terminals and any metal linings within or surrounding the holes if such are used as part of the circuit.

Further, the final shape into which the leads 28 and 32 are formed is determined by the shape of the lead bending elements incorporated in the bending mechanism 38 as described in detail hereinafter. However, such bending mechanism 38 is capable of disposing the terminals 36 and 37 in precisely spaced relationship corresponding to the center-to-center distances between the holes or sockets within which the terminals are to be placed. Further, a suitable portion of the shaped leads, which actually comprise the legs of the generally U-shaped configuration of the component, as illustrated in FIGURE 28, serve as supporting means for holding the body of the component 20 a sufficient distance from the panel board for example so as to provide adequate ventilation for the body, whereby greater efficiency of operation and longer life is provided for the components.

Detailed explanation of the various portions of the overall machine comprising the present invention will now be set forth under appropriate titles.

*Component Arranging, Shifting, and Stacking Means*

The portion of the entire machine which receives a quantity of components arranged at random, progressively feeds the same from said supply in longitudinal sequence to a shifting mechanism, and subsequently to a stacking mechanism for transfer to the indexing and feeding mechanism 14 is illustrated in detail in FIGURES 2 through 13. Said portion of the mechanism comprises a hopper 39 of which a number of commercial types are available, the specific hopper illustrated herein being of the type which is provided with a spiral shelf 40 fixed to the inner walls thereof which extends from the lower portion of the hopper to the upper edge thereof. Said spiral shelf terminates at its upper end adjacent passage forming means 42. Passage forming means 42 comprises a stationary, substantially horizontal plate 44 having a vertical flange 46 affixed to the inner edge thereof. A second plate 48, having a substantially vertical flange 49 affixed to one edge thereof is adjustably supported by plate 44 to provide an exit channel 50, the width of which is adjustable to accommodate preferably the longitudinal passage therethrough of a single component, although a sequential row of such components may be moved along the passage 50 if the length thereof is sufficient to accommodate a plurality of such components, depending particularly upon the length of the bodies of the components.

The hopper unit 39 is provided with suitable means such as vibrating mechanism, not shown, which functions constantly to move components up the spiral shelf to the exit passage 50 and along said passage to shifting mechanism 52, shown in the upper right-hand corner of FIGURE 2 and the lower right-hand corner of FIGURE 3.

Said shifting mechanism comprises a plurality of adjustable and angularly related chutes which function to shift the longitudinal succession of components passing through the exit channel 50 into a stack thereof in which the components are arranged one above the other and parallel to each other.

Referring particularly to FIGURES 2 through 4, 6, and 7, it will be seen that the shifting mechanism 52, in the preferred construction of the invention, comprises a supporting chute 54 within which a plurality of longitudinally adjustable chutes 56 and 58 are mounted. These chutes are best shown in FIGURE 7. The outer end of chute 58 is longitudinally slotted as shown at 60 for purposes of permitting the trailing lead of a component 20 sliding down said chute to drop therethrough, as shown by the arrow in FIGURE 2, after the body of said component abuts a shifting chute 62 which is supported at a lower level than chute 54 and extends in an opposite sloping direction thereto, as clearly shown in FIGURE 2.

It will be understood that after the component leaves the exit channel 50 from the hopper 39, each component slides preferably by gravity down the adjustable chutes 56 and 58, the leading lead thereof passing through a slot 64 which extends upwardly from the lower end of shifting chute 62 for a substantial portion of the length thereof as shown in FIGURE 2. The leading end of the body of the component 20 will come to rest against the walls of the chute 62, and the slot 60 in adjustable chute 58 will permit the trailing lead of the component to fall therethrough and thus shift the position of the component from that shown in full lines in FIGURE 2, progressively to the various positions shown in broken lines in said figure, such shifting involving a somewhat pivoting movement of the leading lead of the components shown in full lines in FIGURE 2 about the shifting pin 66 shown in FIGURES 2 and 4.

Shifting pin is supported by an adjustable arm 68 in order to accommodate the pin to operation with components having leads of various lengths, it being understood, of course, that when the machine is operating upon any particular type of component, all of the components will have similar bodies and similar lengths and diameters of lead. However, the entire machine is adjustable to accommodate components within a relatively wide range of diameters and lengths of bodies, as well as a similar range of diameter and length of leads.

After the components 20 have been tilted or shifted by the chute 62 from the direction in which they were received by said chute from chute 58, said components sequentially slide down chute 62 until the then leading lead of each component passes through a slot in abutment plate 68 which extends upwardly from one of a pair of stacking members 70 and 72. The then leading end of the component 20 contacts abutment plate 68 to stop further longitudinal movement of the component from chute 62. The component then is positioned relative to shifting pin 66 so that the trailing end of the component will fall clear of said pin and permit said trailing lead to be disposed in slot 74 formed in plate 76 which is connected to the upper end of stacking member 72.

When the machine is operating with components of relatively small size, it is desirable to use the adjustable chute 58 and, if the components, for example, have relatively very small diameters of leads, it is desirable to change the chute 58 for one having a slot 60 of suitable size to most efficiently accommodate such small diameters of leads. Further, when the machine is operating with components having larger sizes of bodies, the adjustable chute 58 may be eliminated simply by frictionally sliding the same relative to the lower end of fixed chute 56. As will be seen especially from FIGURE 7, suitable shallow recesses 78 are formed in the undersurfaces of the lower end portion of chute 56 for purposes of accommodating the upper end of adjustable chute 58, the latter frictionally sliding against said recesses 78 when longitudinal adjustment is being effected between chutes 56 and 58.

Also, if desired, the slot 64 in shifting chute 62 may be adjusted in width for purposes of more efficienctly adapting the same to operation with components having leads of various diameters, such adjustments being made possible by any suitable conventional means, not shown, such as a tightening screw.

The stacking members 70 and 72 are similar to each other and each comprises a pair of relatively transversely adjustable guide members 80 and 82, the facing surfaces of said guide members being complementary to each other and of a saw tooth shape as best shown in FIGURE 4. Said saw tooth surfaces cooperate to form a zig-zag passage in each of the stacking members 70 and 72. The opposite leads of the terminals respectively are received in the zig-zag passages 84 of the stacking members 70 and 72 and said passages cooperate to insure downward movement by gravity of the successive components while said components remain substantially horizontal until they abut the upper end of a stack of such components extending upward from the lower end of said stacking members.

In order that the stacking members 70 and 72 may accommodate similar components of a relatively wide range of lengths and diameters of bodies, as well as a suitable range of different diameters of leads, the guide members 80 and 82 of each of the stacking members 70 and 72 are adjustable laterally relative to each other as viewed in FIGURE 4, in order to vary the width of the zig-zag slots 84 in each of the stacking members suitably so that a passage will be provided which freely permits descent of the leads by gravity. However, the width of the passages 84 should be adjusted to a dimension not very greatly in excess of the diameter of the leads, whereby one lead will not tend to race ahead of the other lead and thus destroy the substantially horizontal position of the components while descending the zig-zag passages 84. Various types of adjusting means to permit the varying of the width of passages 84 may be used and one which is found to be highly successful is illustrated in the drawings.

The specific adjustment mechanism for varying the width of the slots 84, as illustrated herein, comprises supporting plates 86 which are L-shaped as shown in FIGURE 8, one of said plates being provided for each of the guide members 82 of the two stacking members 70 and 72. A transverse channel 88 is formed in the outer face of the parallel, outwardly projecting legs of the L-shaped members 86. Said channels respectively receive guide tongues 90 which extend perpendicularly to outer L-shaped members 92, said guide tongues being slidable longitudinally within the channels 88 and are held within said channels by overlapping plates 94 which are connected by suitable screws or the like to supporting plates 86. If desired, the guide tongues 90 may be slotted to receive locking screws 96.

Adjustable guide members 80 are fixed by screws 98 to the inner surfaces of outer L-shaped members 92 as shown in FIGURES 2 and 8, whereby said guide members 80 move with the members 92 when said members are adjusted laterally relative to the supporting plates 86. Such adjustment is effected by a pair of rotatable thumb screws 100 which are anchored to the outer L-shaped members 92 by means clearly illustrated in FIGURE 8 so as to prevent relative longitudinal movement of said screws relative to said plates when the screws are rotated. The inner ends of said screws respectively are threaded into the outer ends of the parallel portions of supporting plates 86, as also clearly is shown in said figure.

The stacking members 70 and 72 also are transversely adjustable relative to each other as viewed in FIGURES 2 and 8 in order that bodies of components 20 of different lengths may be accommodated between said stacking members. For effecting such adjustment, the adjustable guide members 80 and 82 of each of the stacking members 70 and 72 are movable as a unit with the L-shaped supporting plates 86 and the outer L-shaped members 92 of each of said units. Said units each are provided with internally threaded sleeves 102 fixed respectively to said units by screws 104 as shown in FIGURE 8.

Each of the units to which the internally threaded sleeves 102 are connected is guided for sliding movement relative to a base plate 106 which is supported by brackets 108 respectively fixed to a pair of spaced upright members 110 comprising part of the frame of the machine. Said members are best shown in FIGUURES 2 and 4. The base plate 106 is provided with a plurality of slots 112 through which attaching abutments on the internally threaded sleeve members 102 extend for guided movement of said units. Such guiding of the units is accomplished by any suitable means such as a pair of parallel channelled bars 114 which are fixed to base plate 106 as best shown in FIGURES 2 and 9. Complementary flanges are formed on said units for slidable reception by the channels of said guide bars to prevent separating movement of the units from the base plate 106 as is shown from FIGURE 9.

Adjusting shaft 116 is rotatably supported by a pair of bearing blocks 118 which are fixed to the rear surface of base plate 106 adjacent opposite ends of the shaft 116 and longitudinal movement of the shaft relative to said base plate is prevented by a key 120 fixed to base plate 106 and extending into annular groove 122 formed in shaft 116. The shaft 116 is provided with portions which are oppositely threaded, respectively left-hand and right-hand, so as to be complementary to the oppositely threaded interiors of sleeves 102, whereby, when said shaft 116 is rotated, the units which support respectively the stacking members 70 and 72 will be moved simultaneously either toward or from each other, depending upon the direction of rotation of shaft 116. Such rotation is effected readily by a manually operable crank 124 shown in FIGURE 2.

Under circumstances where the components being handled by the machine are relatively small or otherwise of light weight, as compared with larger and heavier components which also may be handled by the machine when suitable adjustments are made, it is sometimes found desirable to facilitate the passage of the leads of such lightweight components down the passages 84 in the stacking members 70 and 72 by providing vibrating units, not shown, on the several units of which the stacking members 70 and 72 respectively comprise a part. Many types of commercial vibrators are adaptable for said use and the same usually may be attached to said units and connected to a suitable power source, such as by an electric conduit, particularly where the vibrators are of the magnetic type. Usually, however, no such additional vibrators are necessary with components of average or larger size.

The length of the composite stacking members 70 and 72 is sufficient that they will accommodate a substantial stack of components within the zig-zag passages 84 thereof. The rate at which components are fed to the exit channel 50 preferably is adjustable and may be regulated so that a steady flow of components through said channel to the stacking members maintains a stack of suitable quantity of said components within said stacking members as the components successively are discharged from the lower end thereof.

To effect such discharge of components and transfer thereof to the indexing and feeding mechanism 14 comprising the pair of index wheels 22 and 24, the guide members 82 of each of the compound stacking members 70 and 72 support at the lower end thereof a pair of spaced guide fingers 126 which accommodate therebetween the bodies of the components 20 as the lowermost component in the stack reaches the position in which the leads extending from the component rest upon the spaced guide fingers 126. A pair of spaced ejecting blades 128, best shown in FIGURE 11, are reciprocated in unison to engage the leads of the components 20 to eject said endmost component in the stack from the outer end of the guide fingers 126.

The pair of ejecting blades 128 each have a guiding and actuating extension 130 which extend transversely to the longitudinal axis of the stacking members 70 and 72. The lower end of each of the guide members 82 of said stacking members is provided with a recess complementary to the preferably square or rectangular cross-sectional shape of the guide members 130 and said recesses are closed at the bottom by cover plates 132. Forward or ejecting movement of the ejecting blades 128 is accomplished simultaneously by the rear ends of the guide members 130 being contacted by the lower end of a pivoted plate 134 which is wide enough simultaneously to engage both of the members 130 as shown particularly in FIGURES 12 and 13.

The upper end of the plate 134 is connected pivotally to the rear surface of base plate 106 by a pivot pin 136. Further, the blades 128 are held in resilient connection with the lower end of plate 134 by a pair of tension springs 138, thereby insuring that when the plate 134 is moved rearwardly from base plate 106, the blades 128 will be retracted thereby. Movement of the lower end of plate 134 is effected by means of a bell crank pivoted at 140 and comprising arms 142 and 144. A link 146 is connected pivotally at its opposite ends respectively to the outer end of arm 142 and a lug 148 carried by the rear face of plate 134. The arm 144 of the bell crank preferably is longitudinally slotted for purposes of receiving a connecting pin 150 by which one end of an actuating link 152 is connected thereto adjustably to permit adjustment of the movement of blades 128. This link is illustrated fragmentarily in FIGURE 4.

The opposite end of link 152 is connected to suitable power means in the portion of the machine next to be described and including rotatable shaft means 154 shown, for example, in FIGURE 15. Any suitable driving means such as a crank disc 156 may be affixed to the right-hand end of countershaft 222, as viewed in FIGURES 15 and 16, so as to be constantly rotatable therewith. An offset crank means such as a bolt 158 may be used to connect said other end of link 152 to the crank disc 156, whereby oscillation of the bell crank comprising arms 142 and 144 may be accomplished, thereby reciprocating the ejecting blades 128 in opposite directions during each complete rotation of the shaft means 222.

*Component Receiving and Moving Means*

The portion of the machine designated as the component receiving and moving means includes the indexing and feeding mechanism 14 which specifically comprises the index wheels 22 and 24. These wheels are supported and operated by that portion of the machine which is best illustrated in overall views in FIGURES 14 through 16. Said portion of the machine comprises a main base 160 which may be fabricated in any suitable manner such as from a single casting or an articulated assembly of metal parts. The base 160 includes a longitudinal supporting plate 162 and a parallel V-way 164 upon which a pair of sub-bases 166 and 168 slidably are supported for longitudinal movement, preferably in opposite directions relative to each other. Suitable position indicating scales 170 and reference lines 172 are provided respectively on the front face of the supporting plate 162 and the front faces of the sub-bases 166 and 168 as clearly shown in FIGURE 14.

Internally threaded bearings 174, respectively of opposite threads, are secured to the undersurfaces of the sub-bases 166 and 168, these bearings receiving respectively oppositely threaded portions of an adjusting shaft 176 which is anchored at the left-hand end of the frame 160, for example, by a fixed bearing 178 in which the left-hand end of the shaft 176 is mounted to prevent longitudinal movement of said shaft relative to said frame, as shown in FIGURE 14. A manually operable crank 180 is fixed to said end of the shaft, whereby when said crank is rotated, the sub-bases 166 and 168 will be moved relative to the main base 160 and in opposite directions relative to each other, depending upon which way the shaft 176 is rotated. Clamping means comprising large wing bolts 177 may be positioned within a suitable slot in frame 160 and threaded respectively into the undersurfaces of sub-bases 166 and 168 to lock the same in adjusted position relative to base 160.

For a clearer understanding of the preferred construction of the sub-bases 166 and 168, sub-base 166 is illustrated on a large scale, in perspective, and with the supported mechanism removed therefrom, in FIGURE 33. It will be understood that these sub-bases are similar except they respectively are left-hand and right-hand. Referring to FIGURE 33, it will be seen that each of said sub-bases is provided with a pair of upstanding standards 182 and 184 integrally connected to the sub-base. Each of these standards has a semi-circular bearing opening therein respectively designated 186 and 188. Bearing caps 190 and 192 respectively are connectable by suitable bolts to the standards 182 and 184 to form complete circular bearing openings. Also, standard 184 is provided with an integral forwardly projecting supporting arm 194 having an angular projection 196 affixed to the forward end thereof. The angular projections 196 on sub-bases 166 and 168 respectively extend toward each other.

The structure which rotatably supports the shaft means 154 is best illustrated in FIGURES 14 through 16 and 19. Said structure comprises a pair of substantially upright standards 198 and 200 which respectively support suitable bearings 202 and 204. The standards 198 and 200 are fixed at their lower ends to main frame 160 at the rear of the machine as viewed in FIGURE 14, said view being from the front of said machine. Further, in FIGURE 14, the component arranging, shifting and stacking means has been removed so as to clarify the view. Likewise, the component bending means 38, to be described in detail hereinafter, has been removed from the machine in order to render the component receiving and moving means 14 more readily observable. Bearings 202 and 204 respectively support opposite ends of the shaft means 154 and a ratchet member 206 is connected to the left-hand end of the shaft means 154, while a locking collar 208 is secured to the right-hand end thereof for purposes of preventing axial movement of such shaft relative to the bearings.

Driving means for rotating the shaft means 154 stepwise, as best shown in FIGURE 15 in plan view, comprise a motor 210, preferably electric, which is supported by an extension 212 from the rearward portion of the main base 160. A gear reduction unit 214, attached to motor 210, includes a drive shaft 216 having a clutch 218 thereon which releasably engages sprocket gear 220. A countershaft 222, parallel to shaft means 154, is supported at its opposite ends by bearings 224 and 226 which preferably are adjustable horizontally in directions transverse to shaft 222. These bearings are shown best in FIGURES 15 and 17. Note from FIGURE 17 that stationary, parallel and horizontal plates 228 are fixed by suitable standards to the main frame 160 and the bearings 224 and 226 respectively are adjustable longitudinally of the plates 228. Adjusting bolts 230 are provided for this purpose, these being arranged adjacent opposite ends of the countershaft 222.

A driven sprocket gear 232 is keyed or otherwise fixed to countershaft 222 and a sprocket chain 234 extends around the sprocket gears 220 and 232. Chain tightener wheel or pulley 236, see FIGURE 17, may be used to maintain the chain 234 tight, if desired. It will be understood, of course, also that, if desired, the sprocket gears 220 and 232 may be replaced by pulleys such as V-pulleys, and a V-belt may be used in lieu of sprocket chain 234 if desired. It is preferred, however, that the drive means for countershaft 222 be of such nature that continuous positive rotation of said countershaft at a steady speed by motor 210 be provided.

Inasmuch as the indexing wheels 22 and 24 are supported for rotatable, stepwise movement, unidirectionally, by shaft means 154, said shaft means is driven stepwise by suitable means including ratchet member 206 which is oscillatably supported upon shaft means 154. A pawl extension 238, see FIGURES 14 and 19, is carried by member 206 and, diametrically opposite said extension 238, a laterally projecting pin 240 is fixed to the ratchet member 206 for the attachment of one end of an adjustable link 242. A crank disc 244 is fixed to the left-hand end of countershaft 222 for rotation therewith, said crank disc having a crank pin 246 fixed thereto to which the opposite end of adjustable link 242 is connected. Hence, rotation of the countershaft 222, by means of crank pin 246, serves to oscillate ratchet member 206.

Pawl extension 238 of ratchet member 206 reciprocably carries a pawl 248 which sequentially engages the teeth of ratchet wheel 250 which is keyed to the left-hand end of shaft means 154, as seen in FIGURES 14 and 15. The oscillating movement of the pawl 248 may be regulated by adjusting the link 242, that is, the angular relationship of the oscillating movement of pawl 248 relative to ratchet wheel 250 may be adjusted by changing the length of link 242. Further, the position of the ratchet wheel 250 and particularly the teeth thereof relative to shaft means 154 may be varied since, as will be seen particularly from FIGURE 19, the ratchet wheel 250 is composite and includes a perimeter portion which carries the teeth, indicated 250 in FIGURE 19, this being connected to a hub portion 252 of the ratchet wheel. Said rim and hub portions of the wheel are adjustable angularly by slots shown in FIGURE 17 which receive locking bolts or screws 254. Such refinements of adjustment are desirable for purposes of orienting certain operating devices of the machine to be described hereinafter. A locking collar 256, see FIGURE 19, holds the compound ratchet wheel 250 connected to the outer end of shaft means 154.

The shaft means 154, particularly as seen from FIGURES 24 and 25, is somewhat complex in nature. It has a central longitudinally extending cylindrical opening extending from one end to the other for purposes of receiving an adjusting shaft 258 coaxially. For a substantial intermediate portion thereof, the shaft means 154 also has a longitudinal spline 260 within which, centrally between the ends of the shaft means 154, a pair of respectively left-hand and right-hand segmental nuts 262 and 264 are received. Oppositely threaded portions 260 are provided on adjusting shaft 258, these extending respectively in opposite directions from the medial portion of shaft 258 and respectively engage the oppositely threaded inner ends on the segmental nuts 262 and 264. Hence, when the adjusting shaft 258 is rotated, the segmental nuts 262 and 264 respectively will be moved toward or from each other simultaneously depending upon the direction of rotation of shaft 258. The left-hand end of shaft 258 also has a manually operable crank 268 by which desired rotation of the shaft 258 is accomplished.

Referring particularly to FIGURE 19, it will be seen that the index wheels 22 and 24 respectively are connected to hubs 270 and 272 by suitable rivets or otherwise and said hubs are provided with re-entrant recesses which receive respectively the segmental nuts 262 and 264, each of the latter having extensions thereon by which the same are connected to said hubs 270 and 272 by screws or any other appropriate means. Thereby, the segmental nuts respectively are fixed to and moved with the index wheels 22 and 24 as the latter are adjusted longitudinally simultaneously and in opposite directions axially of the shaft means 154 as crank 268 is rotated in one direction or the other. The oscillation of the pawl 248 drives the ratchet wheel 250 stepwise and thereby moves correspondingly the index wheels 22 and 24. Further, as will be noted from many of the figures, each index wheel is provided with radially extending notches 274 evenly spaced circumferentially around the wheels, the notches in each wheel respectively being transversely aligned for purposes of opposite pairs of such notches receiving the leads on the opposite ends of the components 20, as will be described in detail hereinafter. Preferably, the number of teeth on the ratchet wheel 250 equal the number of notches in each of the index wheels 22 and 24 whereby, each stepwise movement of the ratchet wheel advances said components along the path traveled thereby, as determined by the index wheels, a distance equal to the distance between successive notches 274 in the ratchet wheels.

As the components are delivered in sequence from the guide fingers 126 of the component stacking means, said components are received by a pair of transversely aligned notches 274 in the index wheels substantially at the position indicated diagrammatically in FIGURE 1. As seen from FIGURE 17, said position will be substantially at the upper end of the curved guide members 276 which correspond in curvature to the circumference of the index wheels 22 and 24 and the inner surfaces of the guide members 276 have a slightly shorter radius than that of the perimeters of said index wheels, whereby said inner surfaces will be spaced slightly outward from the bottoms of the notches 274. The curved guide members 276 are mounted respectively exteriorly of the outer surfaces of the index wheels 22 and 24 and are supported by suitable bracket plates 278, see FIGURE 20, fixed respectively to the sub-bases 166 and 168 so as to be movable therewith when said sub-bases are adjusted relatively to each other.

Preferably, each of the curved guide members 276 are formed in two parts, said parts respectively, adjacent their lower ends, being connected to opposite ends of the bracket plates 278. Hence, as the index wheels 22 and 24 are advanced stepwise in the direction of the arrows shown in FIGURE 1, as well as in certain other figures, the curved guide members 276 will slidably receive the projecting leads from opposite ends of the bodies of the components 20 and thus will prevent the leads and components from falling from the notches 274 during the advancing movement of the components from the arranging and stacking means, to means to be described hereinafter by which the leads of the components are trimmed and terminals are applied to the ends of either one or both of said leads. This latter mechanism is supported by the sub-bases 166 and 168 and is adjustably movable therewith. In addition, at the completion of the trimming of the leads and application of terminals thereto, the components will be moved further by the index wheels 22 and 24, from the means which accomplishes these functions, to the bending and shaping means generally designated by the numeral 38 in FIGURE 1.

In order that the index wheels 22 and 24 will be assured of precise positioning at the completion of each stepwise movement thereof, the machine is provided with positioning means for the index wheels best shown in FIGURES 14, 16, and 17. Said positioning means primarily comprises a cylindrical rod 280 which is supported so as to be substantially parallel to the shaft means 154 by a pair of pivoted arms 282. Attached to and extending upwardly from the tops of standards 184 are a pair of similar brackets 284. The arms 282 respectively are pivotally connected to the upper ends of the brackets 284 and the outer ends of the arms 282 have bearings 286 which respectively receive an end portion and an intermediate portion of the rod 280 as is best shown in FIGURE 14. The end of the rod 280 is fixed to the left-hand bearing 286 as viewed in said figure. The intermediate portion of the rod 280 is longitudinally slidable within the other bearing 286 whereby, as the sub-bases 166 and 168 and the assemblies carried thereby are longitudinally adjusted relative to each other along the main base 160, the rod 280 will be moved by the fixed bearing 286 so as to slide the rod 280 relative to the other, right-hand bearing 286 as viewed in FIGURES 14 and 16.

The outer ends of the pivoted arms 282 which support rod 280 respectively are urged downwardly by a pair of tension springs 288 so that the intermediate portion of rod 280 between the bearings 286 constantly will be pressed against either the peripheral surfaces of the index wheels 22 and 24 between the notches 274 or, when the next succeeding pair of notches 274 reach rod 280 in the stepwise movement of the index wheels, said rod will be urged by springs 288 centrally into the flared outer end of the notches 274 as clearly shown in FIGURE 17, thereby accurately indexing wheels 22 and 24 and the components carried thereby relative to other portions of the machine.

When the index wheels are so positioned by the rod 280, certain other transversely aligned notches 274 of said wheels respectively will be positioned opposite guide fingers 126 of the stacking and arranging mechanism whereby, when the ejecting blades 128 eject the lowermost component 20 from the stack, the leads of said component will be received by said certain pair of notches in the index wheels. Similarly, when the index wheels are so positioned by the rod 280, a certain other pair of transversely aligned notches 274 of the index wheels will be in radial alignment with means in the bending and ejecting mechanism 38, to be described in detail hereinafter. The force exerted by the springs 288 is sufficient so as to accurately position the various notches of the index wheels relative to said shifting and stacking mechanism, as well as the bending mechanism 38, but the ratchet feeding mechanism for shaft means 184 and the index wheels easily overcomes the force exerted by the springs 288 and permits the rod 280 to ride out of engagement with the flared outer ends of any particular pair of notches 274 and over the peripheral outer surfaces of the wheels, into the next succeeding pair of notches.

From the foregoing, it will be seen that the present invention includes adjusting means operable by manually engageable crank 268 which, when rotated in the desired direction, will quickly and accurately move the index wheels 22 and 24 either toward or from each other a sufficient distance to provide a space therebetween capable of receiving the bodies of components which are to be handled by the machine in accordance with the principles of the invention. Preferably, the space between the index wheels is slightly in excess of the length of the bodies of the components as described hereinabove with reference to FIGURE 26 and the function of the positioning blades 26 and 30. Said index wheels are advanced stepwise for purposes of advancing the components sequentially along a predetermined path dictated by the shape of the curved guide members 276, from the shifting and stacking mechanism 12, to mechanism which trims the leads of the components to precise lengths and applies terminals thereto, this latter mechanism being described hereinafter.

The mechanism described hereinabove for holding the leads of the components within the notches 274 of the index wheels employs the above described pairs of curved guide members 276 disposed adjacent the exterior surfaces of said index wheels respectively. This form of the mechanism comprises one embodiment for maintaining the components within a predetermined path while being moved by the index wheel. A second embodiment of component positioning means is illustrated in FIGURE 29 wherein, rather than use said pairs of curved guide members 276, the index wheels have spring means carried respectively thereby, said springs being directly attached to the wheels. In FIGURE 29, for example, only the index wheel 24 is shown inasmuch as said view represents a vertical sectional view through the center of the machine.

It will be seen from FIGURE 29 that the shifting and stacking mechanism 12a also is positioned in slightly different angular relationship relative to the shaft means 154 of the index wheels than in the embodiment shown in the preceding figures. The delivery throat 290 of the means 12a in FIGURE 29 is substantially horizontally opposite the center of the axis of shaft means 154. Under such circumstances, the notches 274 of the index wheels successively will be presented in longitudinal alignment with the delivery throat 290.

In this embodiment, the guide fingers 126a respectively project past the periphery of the index wheels adjacent the inner surfaces thereof as clearly shown in FIGURE 30. Also, the ejecting blades 128a, which are shown best in FIGURE 30, are positioned to be projected radially relative to the exterior surfaces of the index wheels 22 and 30 so as to engage the leads of the component 20 and forcibly insert the same into the respective notches 274 of the index wheels and past the springs thereon, to be described.

This embodiment of the invention also is slightly different from the embodiment shown in the preceding figures to the extent that the shifting and stacking mechanism 12a also is provided at its lower end with a guide block 292 having a guide channel 294 extending upward from the lower surface of the block 292 as clearly shown in FIGURE 29. Said guide channel is provided with flared entrance walls 296, as shown in FIGURE 30, for purposes of centering the bodies of the components 20 between the index wheels 22 and 24. As also will be seen from FIGURE 29, the guide block 292 readily is replaceable by any suitable attaching means such as receiving slots 298 whch are respectively formed in opposite wall members to receive supporting pins 300 projecting from opposite sides of the guide block 292. Obviously, since the guide channel 294 should be of a width substantially equal to the length of the body of the components 20, each time the size of components is changed and the machine otherwise is adjusted to handle the same, a suitable size of guide block 292 for the length of the bodies of the components will have to be placed in the lower portion of the stacking means 12a. However, such an exchange of one of the guide blocks 292 for another easily is accomplished due to the simple attaching means provided therefor.

Referring to FIGURES 29, 31, and 32, it will be seen that the means provided in this embodiment of the invention for retaining the leads of the components 20 detachably within the notches 74 comprise similar spring members 302 which may be made simply from spring wire so as to have an anchoring end 304 and a curved outer end 306 which serves as a cam which, when the leads of the components 20, clearly shown in FIGURES 31 and 32, first are introduced into the slots 274, result in said springs being moved upwardly, as viewed in FIGURES 31 and 32, until the component 20 reaches the innermost position thereof shown in FIGURE 31. In the latter position, the leads of the components will releasably be held behind a locking shoulder 308 formed on each spring.

The locking end 304 of each spring terminates in a perpendicularly extending extremity received in a small hole 310 provided in the index wheels 22 and 24 for each of the notches 274 and the springs otherwise extend around securing screws 311 which secure them to the wheels. By such an arrangement, it will be seen that the leads of each component releasably will be held in the bottoms of each of the notches 274, whereupon the component leads may either be ejected from said notches by mechanism to be described hereinafter, or may only be partially moved longitudinally of the notches for certain other operations to be described hereinafter. When the springs 302 are used, there will be no need to use the curved guide members 276 of the embodiment illustrated in the preceding figures.

*Lead Trimming Means and Terminal Applying Means*

As has been stated hereinabove, each of the subbases 166 and 168 carries a somewhat complex assembly of mechanism therewith which principally is supported upon each base respectively by a pair of substantially parallel standards 182 and 184. Said pair of standards on each sub-base respectively are provided with a pair of bearings 186 and 188 containing bronze-bearing linings 312, for example, see FIGURE 19. Extending axially through said linings 312 and rotatably supported thereby is a sleeve 314 to which a sprocket wheel 316 is connected by a key 318 intermediately of the bearing sleeves 312 as is clearly shown in said figure. One end of sleeve 314 has a locking collar 320 connected thereto and the opposite end of the sleeve is provided preferably with an integral eccentric 322. The sleeve 314 has a central cylindrical opening 324 therethrough in order that said sleeve may be coaxial with the shaft means 154 and receive said shaft means through the opening 324.

Extending inward from the outer end of the eccentric 322 is a cylindrical socket 326 into which the boss 328 of either the hub 270 or 272 of the index wheels may be moved axially. Such an arrangement steadies the rotation of the index wheels 22 and 24 stepwise by the ratchet drive therefor.

Adjustment of the sub-bases 166 and 168 occurs by actuating the hand crank 180 for simultaneous movement of said bases relative to each other in opposite directions, depending upon the direction in which the crank is rotated, as described above. Such adjustment of said bases and all of the mechanism carried thereby is relative to the shaft means 154 and the index wheels 22 and 24. Adjustment of the sub-bases is made primarily to determine the length of the leads desired on the components being handled at the time by the machine. Adjustment of the index wheels 22 and 24 relative to each other must be independent from the adjustment of the sub-bases since the index wheels are adjusted according to the length of the body of each of the components being handled by the machine at any given time, while the sub-bases are adjusted in accordance with the desired length of lead on the components.

During normal operation of the machine, the sprocket wheels 316 and sleeves 314 of each of the units on the sub-bases 166 and 168 are rotated continuously by means of additional sprocket wheels 330 each keyed to the counter shaft 222 as is best seen in FIGURE 15. The countershaft 222 is provided with a longitudinal spline 332 into which a key from each of the sprocket wheels 330 extends. Rearwardly extending brackets 334 are arranged in pairs and respectively are disposed adjacent opposite sides of the sprocket wheels 330, the brackets 334 being fixed respectively to the upright standards 182 and 184 on each of the sub-bases 166 and 168 to insure longitudinal movement of sprocket wheels 330 along shaft 222 when the sub-bases are adjusted. Thereby, as the sub-bases are adjusted longitudinally toward and from each other, the sleeves 314 are moved simultaneously therewith, as well as the driving sprockets 316 and 330 of each sub-base unit, said sprocket wheels of each unit being interconnected by a suitable sprocket chain 336. Several exemplary adjustable positions to which the sub-bases 166 and 168 and the mechanism carried thereby may be moved laterally relative to each other are illustrated in FIGURE 16, respectively in full line and broken line illustrations. Similarly, two different positions to which the index wheels 22 and 24 may be adjusted are illustrated respectively in full and broken lines in said figure.

As will be seen from FIGURE 14 particularly, each of the angular projections 196 which are fixed relative to the sub-bases 166 and 168 support guide blocks 338 having suitable ways for guiding the vertical reciprocation of die carrying members or blocks 346. For details of these members, attention is directed to FIGURES 20 and 34. The guide blocks 338 may be attached to the angular projections 196 by suitable means such as bolts 342. As is seen especially from FIGURE 20, the supporting arms 194 each support a rearwardly extending angular projection 344 to which one of the guide blocks 338 also is secured by bolts 342. Said blocks have V-shaped grooves therein opening outwardly from the inner edges thereof for purposes of receiving the opposite complementarily shaped sides of a vertically reciprocable die block 346 having a recess 348 in one face thereof, see FIGURE 34.

The upper end of the die block 346 is provided with a spherical socket 350 within which a spherical lower extremity 352 is oscillatably mounted by suitable disengageable attaching means. Said spherical extremity 352 depends from an eccentric strap 354 which slidably surrounds the eccentric 322 of the units carried respectively by the sub-bases 166 and 168. Inasmuch as the sleeves 314 constantly are rotated by the counter shaft 222, it will be seen that the die blocks 346 constantly are reciprocated during the normal operation of the machine.

Referring to FIGURES 19 and 21 particularly, it will be seen that the recesses 348 in the die blocks 346 contain a compound die unit comprising a plurality of individual die members, each having respective functions. This compound set of die members is illustrated to best advantage in an exploded perspective view in FIGURE 22. In this figure, however, the dies are shown in reverse position to that in which they are illustrated for example, in FIGURES 19 and 21. An inserting die or plate 356 is outermost in the assembly shown in FIGURES 19 and 21 and includes a narrow vertical slot 358 which serves to insure the positioning of the lead 32 of the component 20, as illustrated in FIGURE 21, for application of a terminal 36 thereto. It will be understood, of course, that a companion compound set of dies is disposed opposite the set illustrated in FIGURES 19 and 21 for purposes of affixing a terminal to the lead 28, for example.

The innermost die 360 which abuts recess 348, performs the dual function of severing the endmost terminal 36 from a strip of connected terminals fed to the terminal applying mechanism and also forms a point 362 on the outer end of the terminal. This is best shown in FIGURE 22. The pointing portion 364 of die 360 has a vertical groove therein which is V-shaped in cross-section in order that the lower cutting end of the portions 364 may form the point 362 on the end of the terminal. The opposite surface on the die, to the rear of the lower edge of portion 364, preferably is straight and comprises a severing or cutting die and cooperates with the preferably straight edge 366 of anvil plate 368, shown best in FIGURE 22.

Said compound die assembly also includes an intermediate or curling die 370 provided with an upwardly extending notch clearly shown in FIGURE 22 which terminates at the upper edge thereof in a pair of substantially parallel curved surfaces 372 and the side walls of the notch diverge outwardly to form wedging surfaces 374 which frictionally engage the outer extremities of the upstanding legs 376 of an exemplary terminal 36 illustrated for example, in FIGURE 37. Curved surfaces 372 of the die are separated by a swaging tongue 377 which forms groove 379 in the lead when the terminal is swaged thereto.

In the functioning of the die assembly, cooperation with various portions of the anvil 378 is essential. Anvil 378 cooperates with anvil plate 368 and is secured by bolts 380 to one face of block 382 fixed to sub-base 166 for example. The assembly of three dies 356, 360, and 370 is secured to the die block 346 by a plurality of bolts 384.

Projecting upwardly from anvil 378, intermediately of the ends thereof, is a member having a small die surface 386 against which the terminal 36 primarily rests while being wrapped around the end of one of the leads such as lead 32, shown in FIGURE 22, by the curved curling surfaces 372 of the intermediate die 370. One end of the die surface 386 is pointed so as to cooperate with the pointing portion 364 of die 360, thereby forming the point 362 on the applied terminal 36. The excess part 388 drops from the anvil assembly after severance.

Inasmuch as the initial contact between the die assembly and the endmost terminal takes place between the wedging surfaces 374 of curling die 370 and the upstanding legs 376 of the terminal 36, frictional engagement is achieved between said upstanding legs and the wedging surfaces 374 so as to serve to position the terminal relative to the die assembly and hold it in operative position relative thereto while the die assembly continues to descend and the severance of the endmost terminal from the strip upon straight edge 366 of the anvil plate 368 takes place. Meanwhile, the vertical slot 358 in the inserting die 356 insures accurate positioning of the lead of the component relative to the opposite legs 376 of the terminal 36. Simultaneously with such severance of the endmost terminal from the strip, the end of the severed terminal outermost relative to the component lead is provided with a point 362 and still further descent of the die assembly effects complete curling of the legs 376 of the terminal about the outer extremity of the component lead indicated 32 in FIGURE 38 for example, and swages said terminal to said lead.

The anvil surface 386 and the curved die surfaces 374 in curling die 370 respectively are tapered relative to each other in order to form an outwardly directed taper upon the applied terminal as shown in FIGURE 38. Such taper blends in with the point 362 on the end of the terminal and the entire assembly greatly facilitates the insertion of such combined terminal and lead into a suitable hole or socket in a circuit board, for example, having circuit means into which the component 20 bearing such terminals is to become a part.

For a better general understanding of the details of the terminal applying and swaging operation and also for a more elaborate illustration of the details of the dies for performing the same, attention is directed to co-pending application Serial No. 520,544, filed July 7, 1955, in the names of Glenwood A. Fuller, Robert Ullman, and Rossiter R. Potter.

Guiding of the compound die assembly relative to the anvil unit during the reciprocation of the die assembly somewhat is facilitated by providing on the lower extremity of the severing and tipping die 360 a pair of depending legs 390 which respectively are slidably received within a pair of vertical recesses 392 formed in anvil member 378 and closed by anvil plate 368. When the die assembly has achieved full descent, the attached terminal 36 not only is shaped as shown in FIGURE 38, but the same also is somewhat elongated over its original length, due primarily to the tapered relationship of the anvil surface 386 and the curved curling surfaces 372. As this swaging and elongating operation takes place, the lead to which the terminal is being applied is moved slightly longitudinally away from the die and anvil assembly but, as has been explained hereinabove, the index wheels 22 and 24 are spaced apart a distance sufficiently greater than the length of the body of each of the components 20 that such movement of the leads and components away from the die and anvil assembly may take place without injury, such as possible buckling, to the lead on the component.

After the curling of the terminal 36 has occurred and the same is swaged to the lead, there is a tendency for the applied terminals to stick in the curling die 370, particularly when the ascending movement of the die assembly commences. Hence, a pair of stripping blades 394 which are relatively thin and are fixedly supported upon stationary projection 344 for example, as shown in detail in FIGURE 34, extend along opposite surfaces of the lower portion of the curling die 370 as shown in FIGURES 21 and 34. These stripping blades engage opposite ends of the applied terminal which projects longitudinally beyond said opposite surfaces of die 370 so as to insure stripping of the applied terminal from the entire die assembly and particularly the curling die 370. The spaces which accommodate the stripping blades 374, which are arranged between the intermediate die 370 and the outermost dies 356 and 360, are clearly shown in said figures.

The terminal applying assemblies or units 34 and 35, each of which comprise a set of compound die members and anvil assembly such as has just been described, are spaced longitudinally to each other along the path generated by the stepwise movement of the index wheels 22 and 24, as best shown diagrammatically in FIGURES 1 and 26. As a result of this, after a terminal has been applied to one lead of a component, said component is moved along its arcuate path, usually an amount equal to the distance between two adjacent notches 274 in the index wheels, and then a second terminal is applied to the other lead of the component when, as is usually the situation, terminals are to be applied to both leads of each component. It is to be understood, however, that if a terminal is to be applied only to one lead, then the terminal applying unit which would apply the other lead is rendered inactive. However, when in the normal course of operation of the machine, leads are to be applied to both terminals of a component, then the application of the first terminal to one of the leads of a component will move the component longitudinally toward the opposite index wheel and thereby position the same so that when the second terminal is applied, the swaging operation incident to such application will move the component longitudinally in a reverse direction and without damage to either of the leads.

The trimming of the excess amounts from the ends of the leads prior to the application of terminals thereto is accomplished by apparatus carried by the terminal applying units affixed to each of the sub-base units 166 and 168. Referring particularly to FIGURE 34, it will be seen that a fixed cutter 396 is attached securely to sub-base 166, for example, and a vertically movable cutter 398 is connected by a suitable lateral support to the die block 346 so as to be reciprocable therewith. Said cutter members are spaced from the essential portions of the compound die assembly along the path of movement of the components a distance substantially equal to that between three successive notches 274 in the index wheels, while the individual cutter units on the sub-base units positioned at opposite sides of said path of movement are spaced apart along said path a distance equal to that between two successive notches 274 of said index wheels. By such an arrangement, the diagrammatic layout in FIGURE 26 is established. That is, the excess from the outer end of one lead first is trimmed, the index wheels advance a distance equal to that between a pair of notches, the excess then is trimmed from the outer end of the opposite lead, the index wheels then are advanced again as described, the first terminal is applied to the end of the first-trimmed lead and is moved transversely to the index wheels in order to position the component for application of the second terminal, the index wheels then being advanced another step as described, and the application of the second terminal then takes place, thus completing the lead trimming and terminal applying operations upon a single component. Meanwhile, other components successively are progressively having the same sequence of operations performed upon them.

Since the trimming of the leads of the components takes place prior to the application of the terminals to the trimmed leads to provide terminals of precise desired lengths, it is preferable that the lead trimming means be adjustable with the applying means laterally relative to the path of movement of the components. The applying means are adjustable laterally to adapt the machine to different components having a relatively extensive range of lengths of leads, as has been described above, as well as different diameters of leads. Hence, simultaneous adjustment of the trimming means with the applying means affords a very convenient arrangement.

The positioning of the opposite ends of the bodies of each of the components 20 successively against the inner surfaces of the index wheels 22 and 24 is accomplished by means of the positioning blades 26 and 30 as has been described briefly above. Said blades may be supported by any suitable mechanism, one example of which is illustrated in FIGURE 35. This specific illustration comprises an upstanding support 400 which is fixed at its lower end for example to the outer surface of the V-way 164. A pair of inwardly directed arms 402 and 404 are connected at one end to the supporting member 400 and the opposite ends thereof respectively support the blades 26 and 30 as is clearly shown in said figure. The blades 26 and 30 serve somewhat in a camming capacity.

In order that the blades 26 and 30 might function accurately after the wheels 22 and 24 have been adjusted axially relative to each other, it will be seen that the arms 402 and 404 likewise preferably are adjustable in a direction transverse to the vertical axis of the support 400 in a direction parallel to shaft means 154. Any suitable means such as an adjusting screw 406 extending between separated portions at the top of support 400 may be utilized for this purpose. This will be necessary since blade 26 functions relative to index wheel 24 and blade 30 functions relative to index wheel 22, whereby the arms 402 and 404 must be adjusted respectively in opposite directions to each other. If desired, a second positioning blade 26' which cooperates with wheel 24, may be used, in succeeding position to blade 30, as shown in FIGURE 26, to position the component for application of terminal 37 to lead 32. Blade 26' suitably may be supported with blade 26.

Particularly when the terminals are being applied to the leads of the components, especially in order that the leads will not be bent while the application of the terminals is taking place, it is desirable that the leads of the components be permitted to move longitudinally outwardly from the notches 274. In regard to the embodiment of the invention which employs the curved guide members 276, such outward movement of the leads relative to the notches is accomplished by the use of the bracket plates 278 which respectively are adjustably fixable relative to the sub-bases 166 and 168 by means of vertical slots 408 through which securing screws 410 pass. The curved guide members 276, which extend outwardly in both directions from the terminal applying means adjacent the outer surfaces of each of the index wheels 22 and 24, will function to hold the component leads in the notches 274 until the components reach the bracket plates 278 during their movement. Said bracket plates each are provided with a recess 412 intermediately of the opposite ends of the plates 278 and the upper surfaces of said plates between the ends of said recesses 412 in each plate and the opposite ends of the plates respectively are sloped in opposite directions as indicated at 414 and 416 to serve the function of the curved guide members 276 in that area.

When, however, the terminals reach the recesses 412 successively in moving along the path of the components, a resilient spring 418 having an intermediate supporting portion 420 serves to hold the leads in the notches 274 resiliently. The opposite ends of the spring 418, as will be seen particularly from FIGURES 18 and 20, slope downwardly in opposite directions from said intermediate portion 420, one of said ends extending farther than the other and said longest end being secured to a suitable bracket 422. Said bracket is secured by a suitable screw to the bracket plate 278 on each sub-base assembly.

In view of the provision particularly of the intermediate supporting portion 420 of the springs 418, the leads at opposite ends of each of the components 20 will slide along said intermediate portions 420 of the springs engaged by the opposite leads when moved along their path by the index wheels 22 and 24 in the vicinity of the terminal applying dies. Accordingly, when the downwardly moving compound die assemblies including curling die 370 descend to affix a terminal to the end of one lead of the component, radial movement outwardly from the bottom of the notches 274 in the index wheels is permitted due to the yieldability of the springs 418 and no accidental bending of the leads will take place. The flexibility of springs 418 is selected to prevent this. After the leads slidably are moved along the intermediate portions 420 of the springs, they engage the slope 414 of each of the bracket plates 278 and, from there, said leads once again engage the inner surfaces of the curved guide members 276, along which they are moved to the bending mechanism 38.

Feeding of Terminals

The terminals 36 and 37 which are applied to the preferably trimmed outer ends of the leads of each of the components 20 are arranged in strip form to facilitate applying the same to the terminal applying means included in each of the assemblies of mechanism respectively carried by the longitudinally adjustable sub-bases 166 and 168. Of the various figures embodied in the drawings, FIGURES 14, 16, 19, and 21 best illustrate the overall arrangement and specific details of the terminal feeding means. A fragmentary exemplary series of terminals 36 or 37, arranged in strip form and capable of being fed by the specifically illustrated mechanism in the aforementioned figures, is shown in FIGURE 36. As has been stated above, said individual terminals 36 or 37 preferably are somewhat U-shaped as shown in FIGURE 37, so as to facilitate the application of the terminals to the end of the leads by the mechanism and in the manner described above. Although a specific shape for each of the upstanding legs 376 on each of the terminals is illustrated in FIGURES 36 and 37, it is to be understood that the components contemplated for being handled by said machine may require specific shapes of terminals other than those illustrated and said illustrations in this application therefore are not to be regarded as restrictive.

Strips of terminals such as fragmentarily are illustrated in FIGURE 36 and previously blanked from strip material by progressive dies, for example, may be provided of indefinite length and coiled upon suitable means such as exemplary reels 424 shown in FIGURE 16. One of such reels is mounted at each of the opposite ends of the frame of the machine, the same being supported rotatably by a suitable bracket 426 connected to the legs, for example, which support the main base 160. The strips 428 of terminals are coiled upon the reels in a reasonably orderly manner so as to insure ready uncoiling of the strips from the reels as such strips are fed stepwise to the terminal applying means on each of the assembled units respectively carried by the sub-bases 166 and 168. In passing from one of the reels 424, the strip 428 passes along a curved guide member 430 and through a guide thimble 432 carried by a supporting member 434 fixed to the outer end of the sub-base 166 as shown in FIGURE 21. It will be understood, of course, that a similar supporting member and guide thimble are connected to the outer end of the other sub-base 168.

A guide channel 436 is formed in the upper surface of block 382 fixed to the sub-base 166 and extends longitudinally along said block from opposite ends thereof between supporting member 434 and the anvil plate 368 as shown in FIGURE 21. The strip of terminals 428 moves along said guide channel toward the terminal applying means comprising the composite dies, such movement being stepwise by a reciprocating pawl 438 having a depending tooth at the forward end thereof which engages the trailing vertical edges of the upstanding legs 376 of the terminals to effect such feeding thereof.

Reciprocation of the feeding pawl 438 is effected by any suitable power means and, in the specific illustration appearing in the drawings, the means selected for this purpose comprises a fluid operated cylinder 440 having a reciprocable piston rod 442 projecting from the forward end thereof. A head 444, connected to the forward end of the piston rod 442 oscillatably supports the pawl 338, a suitable spring clearly shown in FIGURE 21 serving normally to urge the depending pawl tooth toward its lowest position. However, upon retracting movement of the pawl to engage the next succeeding terminal, said spring will permit the pawl 338 to be rotated counterclockwise while moving rearwardly in order that the feed tooth thereof will pass over the legs of the next succeeding terminal and then drop into position rearwardly of said legs thereof so as to advance said succeeding terminal upon the next forward movement of the pawl by the fluid operated unit.

During the return or retracting stroke of the pawl 338, to insure that the strip of terminals positioned within guide channel 436 does not move in retracting direction therewith, appropriate means are provided to prevent such retracting movement, the same comprising an exemplary friction shoe 446 which is pivotally supported upon one end of a lever 452, said lever being pivotally connected by a pin 448 to any suitable member fixed relative to the sub-base 166. Friction pressure is created by suitable tension spring 450, shown in FIGURE 21, which extends between the outer end of lever 452 and any suitable fixed means such as pin 454 shown in FIGURE 14.

Even though the countershaft 222 is constantly rotating during the normal operation of the machine for purposes of continually reciprocating the die block 346 and its assembly of dies thereon, as well as movable cutter 398, and said countershaft, through actuation of a ratchet drive, also advances the index wheels during each rotation of the countershaft a distance equal to that between a pair of succeeding notches in said index wheels, it nevertheless is preferable to avoid any possible jamming of terminals in the die and anvil mechanism of the applying means, if, for example, no components are being moved along the contemplated path therefor by the index wheels or if possibly a pair of notches in said index wheels have not been loaded with a component as might occur for example by a mis-functioning of the ejecting blades 128 at the lower end of the stacking mechanism.

Accordingly, to insure that a component will be positioned suitably relative to the terminal applying means for application of terminals to one or both of the leads thereof when the die block and attached dies are moved downwardly, the feed of the strip of terminals to the applying mechanism is controlled by the arrival of a component at the applying means. To effect such feeding, a very sensitive switch 456, best shown in large scale in FIGURE 29, is used to activate the feeding means. Said switch comprises a base member of insulating material which supports a fixed contact 458 normally positioned slightly spaced from an elongated, slender and flexible movable contact member 460 which is electrically insulated therefrom. The upper end portion of movable contact 460 is in suitable vertical alignment with the path traveled by the leads projecting from one end of each of the components as moved stepwise along their path by the index wheels 22 and 24. This is shown best in front view in FIGURE 19.

Referring also to FIGURE 27, wherein the stepwise movement of components is illustrated diagrammatically, the operation of the movable switch member 460 is shown very clearly. Although the feed of terminals from both the left-hand side and right-hand side of the machine are illustrated in FIGURE 27, only a single switch 456 is shown, said switch being the one engaged by the leads 32 of the components 20. However, it will be seen that as the components 20 are moved into position for the leads to be received by the endmost terminal for application of the terminal thereto, the upstanding flexible and movable switch member 460, which may be termed a feeler finger, will be engaged by the lead to which a terminal is to be applied and will move said movable contact member into engagement with fixed contact 458 of the switch. This closes a circuit which operates a solenoid air valve 462 for example, see the circuit diagram in FIGURE 51, to control the inlet of air to the cylinder 440 of the mechanism for reciprocating the feeding pawls 458. Any suitable source of air pressure may be used to furnish air to the cylinders 440 but no specific means are illustrated in the drawing. For example, a pressure tank having a compressor connected thereto may be connected by suitable conduits to each of the cylinders 440 respectively included in the mechanism units individually connected to sub-bases 166 and 168.

Further, the circuit controlled by the switch 456 including the contacts 458 and 460 is included within a suitable commercial control unit 464 shown in FIGURE 51. This unit is illustrated merely diagrammatically and can constitute any one of a number of units appropriate presently available, the desirable characteristic of such control unit being that once the circuit has been established between the contacts 458 and 460, suitable relays or other mechanism are operable to insure that the feeding movement of the pawls 438 will be assured through a complete feeding stroke. It also will be understood that although pneumatically operated cylinders 440 are shown specifically in the present illustration, other types of mechanisms may be used to effect reciprocation of the feed pawls 438 within the purview of the present invention but the operation of such units preferably will be controlled by the advancing movement of the components to the terminal applying means. Also, the length of the upstanding switch members 460 is precise, whereby after it is flexed into contact with fixed contact 458 by the component lead, said lead then passes over the upper end of it, thus permitting the contact 460 to restore itself to normal position spaced from contact 458.

If the feeding of the strip of terminals 428 should become impeded, for example, as by the outermost convolution thereof upon the reel 425 becoming tangled with an adjacent convolution, the strip 428 will become taut as it moves along the guide member 430. Such tensioning of the strip will tend to straighten the same between said guide member and the reel, thereby causing the strip to depress actuating member 466 of a very sensitive switch 468 such as a micro-switch. Said switch is supported by any suitable fixed bracket 470 attached to the main frame of the machine.

As will be seen from the circuit diagram in FIGURE 51, the switches 468 are embodied in the main power circuit to the motor 210 and preferably are included in the circuit to the main starting switch 472 for said motor. Hence, when the actuating member 466 of either switch is moved by such tensioning of the strip of terminals 428, as when a tangle occurs, the switches 468 are opened, thereby interrupting the circuit of the main line to the motor 210 and said motor, as well as the entire machine, then will stop. The stopping of the machine, of course, will be a signal to the attendant that a difficulty has occurred and any jamming of the operating mechanism for the pawl feeding means, for example, will be avoided.

The machine also is provided with control means which similarly will stop the motor 210 and the entire machine in the event the supply of the strip of terminals 428 becomes exhausted. The control means for this function comprises another sensitive switch 474 carried by each of the units supported respectively by sub-bases 166 and 168. Said switches may be a micro-switch and, as with the first mentioned control switches 468, the same are connected in the main control circuit to the motor 210 as is shown in FIGURE 51. However, the switches 474 are provided with actuating members 476 which are positioned to be engaged by the strips of terminals 428 as the same move along the path therefor between guide thimble 432 and guide channel 436, as is shown in FIGURE 21.

Normally, such engagement of the actuating member 476 with the strip of terminals 428 holds the switch closed and thereby maintains the circuit to motor 210 in operation. However, upon the trailing end of the strip of terminals 428 passing through the guide thimble 432 and from beneath the actuating member 476 of the switch 474, said actuating member 476 will drop so as to interrupt the circuit and thereby stop the motor 210 and the entire machine. Starting of the machine cannot be caused until the supply of terminals has been reestablished inasmuch as the pair of switches 474 as well as the pair of switches 468 all are connected in series with each other within the main circuit to the starting switch 472 which primarily controls starting and stopping of the motor 210, as is clearly shown in FIGURE 51.

From the foregoing, it will be seen that preferably, the fluid operated cylinders 440 respectively are connected to mounting plates 478 shown in FIGURES 14 and 16. Said plates are adjustable axially respectively on the sub-bases 166 and 168 in the direction of the adjusting shaft 176 so as accurately to position the pawl 438, as desired, relative to the position at which it is desirable for the same to engage the endmost terminal 36. Such adjustment is permitted, for example, by longitudinally extending slots 480 formed in the mounting plates 478 as shown in FIGURE 14, and suitable locking screws or bolts 482 maintain said plates in any desired position of adjustment relative to the sub-bases. Further, the slots 480 preferably are of sufficient width that a limited amount of transverse or lateral adjustment of the plates 478 may take place in a direction parallel to the path of movement of the components through the machine. Such adjustment is controlled and obtained, for example, by the use of adjusting bolts 484 carried by the upper ends of upright bars 486 connected to the front faces, for example, of said bases 166 and 168.

In the event the fluid operated cylinders 440 are of such nature that they are double acting, by means of air or the like, it has been seen from the foregoing description that the actuation of the lead pawls 438 in feeding direction is controlled by the switches 456, said switches, in turn, being controlled by the advancing movement of the components 20. However, where it is not desired to use a spring return within the cylinders 440, for example, to effect retracting movement of the pawls, and fluid is used to accomplish the same, the flow of fluid to the cylinders 440 for piston retraction may be controlled by simple means such as a cam 488 fixed to continuously rotating countershaft 222 as shown in FIGURE 15. A fluid control valve 500 may be fixed to any suitable stationary member on the sub-base 166 or 168, it being understood that each of the assemblies on said sub-bases will include one of such cams 488 and control valves 500, or a single cam having plural rises to operate respectively two sections of a compound valve 500 may be used. Fluid conducting conduits such as conduits 502 shown in FIGURE 14, may be used to connect the valves 500 with a source of fluid supply and the cylinders 440.

Where, however, the cylinders 440 are fluid operated in one direction only, the circuit to the solenoid valves 462 will be opened by suitable means such as a constantly rotating cam 504, see FIGURE 51, which, for example, may be fixed to countershaft 222 and continually rotated thereby. Said cam periodically, in timed sequence with operation of other parts of the machine, will close a switch 506 which, for example, engages a return coil in the solenoid switch 462 to close the valve and shut off the air supply so as to permit the springs within the cylinders 440 to retract the pawls 438.

After the terminals 36 have been applied to the trimmed outer ends of one or both of the leads 28 or 32 of the components 20 which are fed in succession, stepwise, through the machine by the index wheels 22 and 24, said tipped leads still are positioned within the notches of the index wheels for movement from the terminal applying means to the bending and ejecting mechanism for unit 38. The details of said mechanism or unit, and the functions thereof, now will be described.

*Lead Bending and Shaping Means*

The portion 38 of the entire machine which receives the components tipped with terminals and bends the leads thereof to predetermined shape is illustrated in various degrees of detail in FIGURES 39 through 50. This portion of the machine primarily comprises a base member 508 having a projecting ear 510 through which a clamping and pivot bolt 512 projects. A supporting bracket 514 is attached by a pair of arms 516, or otherwise, to the front portion of the main base 160 of the machine so that the bracket 514 is stationary relative thereto. The lead bending mechanism 38 is not illustrated in the overall views such as FIGURES 14 through 17 of the entire machine for purposes of facilitating details of the component indexing and feeding mechanism to be seen more clearly. From FIGURE 29, however, as well as the diagrammatic view of 1, it will be seen that the lead bending means 38 is positioned at a level above the terminal applying portions of the machine and the arms 516 are suitably shaped so that the bending mechanism 38 is positioned as desired on the front portion of the machine.

The base member 508 of mechanism 38 is angularly variable relative to supporting bracket 514 so as to align the component receiving means of mechanism 38 longitudinally with the notches 274 of index wheels 22 and 24 as said notches are moved stepwise into alignment with said receiving means and said notches are held momentarily in such alignment by rod 280, FIGURE 23. Such angular adjustment of the base member 508 relative to bracket 514 is maintained in any desired position by a locking bolt 518 which extends from member 508 through an arcuate slot 520 in bracket 514.

Base member 508 has a pair of substantially parallel side flanges 522 which project toward the index wheels, the lower ends of said sides having a pair of substantially parallel V-ways 524 fixed thereto as is clearly shown in FIGURE 39. Slidable in a direction radially relative to the index wheels 22 and 24 is a substantially horizontal ram 526, the opposite edges of which are complementary to the V-ways 524 so as to be supported thereby.

Power means for reciprocating the ram 526 are mounted upon the base member 508 as is clearly shown in FIGURE 40, the exemplary power means specifically illustrated therein comprising a cylinder 528 which, preferably, is actuated by fluid such as air conducted to said cylinder through a supply conduit 530. The piston rod 532 projects from one end of the cylinder 528 and said projecting end thereof is fixed to the base member 508 by a set screw 534, for example. Hence, the cylinder 528 moves relative to rod 532.

The end of cylinder 528 adjacent the projecting end of piston rod 532 is provided with a head 536, fixed to the cylinder. As shown in FIGURE 43, the head 536 is secured by set screws or otherwise to one end of a pair of guide shafts 538, the opposite ends of said guide shafts being fixed to the inner end of ram 526. Guide bearing plate 540 slidably supports the guide shafts 538, while the V-ways 524 support the ram 526. Inasmuch as the cylinder 528 is fastened through guide shafts 538 to the ram 526, said elements reciprocate as a unit relative to the piston and piston rod 532 which is anchored relative to main base 508.

Air or other actuating fluid is supplied to cylinder 528 for movement thereof toward the left as viewed in FIGURE 40, which is the retracting movement of the ram 526, through a control valve 542, see FIGURE 15. Said valve 542 is actuated in timed sequence with the other operating mechanisms of the entire machine by any suitable means such as a cam 544 fixed to the constantly rotating countershaft 222 so as to provide a definite cycle of operation for the ram 526 in forward and retracting directions.

Fixed to and reciprocable with the ram 526 is a block 544 which extends upwardly therefrom and between the opposite side flanges 522 of the base member 508. One of the side flanges 522 is provided with a slot 546 parallel to ram 526 and a bolt 548, or other suitable means, extends through the slot and connects the lower end of an L-shaped rack member 550 fixedly to block 544 so as to be reciprocable therewith and with ram 526. The forward, substantially horizontal end of the rack member 550 is provided with rack teeth 552.

Connected to the outer surfaces of the opposite side flanges 522 are a pair of substantially parallel supporting arms 554 which have bearing openings in the outer ends thereof for purposes of oscillatably supporting a shaft 556 having a spur gear 558 fixed thereto and meshing with rack teeth 552. Fixed to said shaft intermediately of the ends thereof is an anchor block 558 to which one end of a transfer blade 560 is secured for oscillation therewith as said rack 550 reciprocates.

Detachably secured to the outer end of ram 526 is a bending anvil 562 supported by a transverse bar 568 having a positioning pin 570 projecting rearwardly therefrom into a suitable positioning socket formed in the outer end of ram 526 so as to stabilize the bending anvil relative to the ram. The anvil 562 and bar 568 also are supported slidably by a transverse plate 564 fixed by screws 566 to the underside of V-ways 524. Projecting forwardly from opposite ends of transverse bar 568 are a pair of substantially parallel anvil arms 572 which are spaced apart in a direction transverse to the ram 526 to receive the component bodies therebetween, the outer surfaces of said arms 572 being spaced precisely to correspond to the distance desired between the bends to be formed in the leads 28 and 32 of each of the components 20. This is shown in FIGURE 48.

During the operation of the machine, the index wheels 22 and 24 move clockwise as viewed in FIGURE 40 and advance the components 20 stepwise in the direction of the arrow shown in said figure. When a pair of the notches 274 in the respective index wheels reach a position adjacent the upper ends of the curved side members 276, the bending mechanism 38 commences its cycle. The cycle of the ram 526 and the bending anvil 562 is illustrated successively in FIGURES 44 through 46. Referring to FIGURE 44, it will be seen that the ram 526 and cylinder 528 connected thereto are at one end of the stroke of the same. The cycle, as controlled by cam 544, shown in FIGURE 15, includes the movement of the ram 526 toward the index wheels. Such movement also moves the rack member 550 toward the index wheels and thereby rotates transfer blade 560 from a position between the index wheels, clockwise, so as to engage the body of the component 20, which has occurred in the portion of the cycle illustrated in FIGURE 45.

Such so-called forward movement of ram 526 not only rotates the shifting arm 560 but also moves the anvil fingers 572 toward the index wheels, whereby, by the time the finger 560 actually is moving the component 20 from between the notches 274 of the respective wheels, the forward end of the anvil fingers will be positioned to overlap the upper ends of the curved guide members 276 and thereby provides a continuous lower guiding surface which is substantially horizontal, for the leads extending from the opposite ends of the component 20. At the completion of this forward cycle of movement of the ram 526, the shifting finger 560 will have moved to its farthest position clockwise, wherein it still engages the body of the component 20 and holds the leads thereof respectively in the seats provided on the anvil arms 572 comprising upright shoulders 574.

Such forward movement of the ram 526 is accomplished by spring means, not shown, within the cylinder 528, assisted by auxiliary springs 575 which respectively surround the guide shafts 538 and extend between the inner end of ram 526 and guide plate 540. The retracting portion of the cycle of movement of the ram 526 and the elements connected thereto will be explained hereinafter following a description of the details and function of the vertical ram 576.

FIGURE 39 illustrates ram 576 and it will be seen that the opposite edges thereof, as shown in FIGURE 41, are complementarily shaped respectively for reception in opposed vertical V-ways or guide members 580 which are secured by suitable screws 582 to the forward faces of side flanges 522 or elongated recesses formed in said side flanges.

Vertical ram 576 is reciprocated cyclically in upward and downward directions by power means, the specific example of which illustrated herein comprises a fluid operated cylinder 584 which, in the preferred embodiment of the invention, comprises a double acting, pneumatically actuated piston within the cylinder, the piston rod 586 thereof preferably being threaded so as to engage internal threads in the upper end of ram 576 and also threadably carry an adjustable, movement limiting thumb nut 588. Such nut limits the upward movement of ram 576.

As will be seen particularly from FIGURES 39 and 40, opposite ends of the cylinder 584 are connected to fluid conduits 590 and 592, the other ends of the conduits being connected, for example, to control valve 542 or an additional similar valve associated therewith and operable by a cam 544 which, for example, may have an additional rise or depression therein for causing the valve 542 to function sequentially and supply fluid such as air to the required end of cylinder 584 for purposes of reciprocating the ram 576, as desired, in timed sequence with the other movable members of the bending mechanism 38.

Ram 576 actually is bi-partite in that it includes a separately movable section or sub-ram 594 which is slidable longitudinally relative to ram 576 within a vertical channel 596 therein. The front face of channel 596 is covered by a plate 598, for example, for purposes of retaining the sub-ram 594 in operative position within the channel 596. The amount of relative movement between the sub-ram 594 and the ram 576 is not great and is for purposes to be described presently. It will be seen that a guide shaft 600 extends upwardly from the upper end of sub-ram 594 through a bearing 602 extending longitudinally through a portion of vertical ram 576. A coil spring 604 surrounds guide shaft 600 and extends between the upper end of sub-ram 594 and the lower surface of that portion of vertical ram 576 through which the bearing 602 extends. Such spring moves sub-ram 594 downwardly relative to vertical ram 576.

The upper end of guide shaft 600 extends into an opening 606 formed in ram 576 as clearly shown in FIGURE 39, a pair of locking thumb nuts 608 being adjustably threaded on the upper end of guide shaft 600 for purposes of regulating the downward movement of sub-ram 594 relative to vertical ram 576.

The lower end of sub-ram 594 integrally carries a vertical rack 610 having rows of parallel rack teeth respectively on opposite sides thereof, for purposes to be described.

Clamping fork 612, comprising a pair of parallel clamping arms 614, shown in FIGURE 42, is secured to the lower end of sub-ram 594 by a locating pin 616, see FIGURES 44, which frictionally projects into a suitable socket in the lower end of the sub-ram. Preferably, the clamping fork 612 readily is replaceable for purposes of substituting a fork of one side for another, inasmuch as the spacing between particularly the inner end portions of the clamping arms 614 thereof should correspond substantially to the spacing for the anvil arms or blades 572 in order that the inner ends of the clamping arms 614 may cooperate with said anvil blades 572 for purposes of clamping the leads of a component therebetween when a component has been transferred by blade 560 to the anvil arms 572. Such clamping of said leads is effected while said leads are being bent to desired shape by means described immediately hereinafter.

Preferably, the lower edges 618 of clamping arms 614 are tapered slightly upwardly from the inner ends thereof inasmuch as when the anvil blades 572 are projected to supporting position for the leads as shown in FIGURE 46, said lower edges 618 cooperate with the upper surfaces of anvil blades 572 to form a guideway through which the leads are moved when the transfer blade 560 is moving clockwise to transfer a component from the index wheels. Blade 560 will dispose the leads of the component against the seat formed by shoulders 574 on the anvil blade 572 as shown in FIGURE 46. Hence, the outer ends of clamping arms 614 primarily serve as guide means to define the upper surfaces of a guideway through which the leads of the component travel to seats 574. The outer portions of the clamping arms 614 are offset laterally outwardly from the inner portions of said arms which actually comprise the clamping portions which cooperate with the anvil blades 572. In addition, as is shown in FIGURE 42, the outer ends of arms 572 are flared inwardly to facilitate guiding of the bodies of the components therebetween while the leads are being moved to the seats 574.

When the ram 576 and sub-ram 594, which initially moves therewith during the downward stroke of said rams, have descended sufficiently that the inner portions of the clamping arms 614 have engaged the leads of a component positioned upon the anvil blades 572, further downward movement of sub-ram 594, as well as rack 610 which is integral therewith, is arrested. However, ram 576 continues to move downwardly an additional short distance for purposes of actuating the bending arms 619 which respectively are of left-hand and right-hand configuration as shown in FIGURE 39 and are oscillatably supported in transversely spaced relationship to each other by the lower end of ram 576 as is shown in detail in FIGURE 50.

A pair of spur gears 620, see FIGURE 42, respectively are oscillatably supported upon pivot bolts 622 which are threaded into sockets 624, see FIGURE 50, formed in the lower end of said ram 576. Each pivot bolt successively passes through a clamping washer 626, an aperture 628 in the upper end of the bending arm 619, a central aperture in the spur gear 620, and into the socket 624. The gears 620 respectively mesh with opposite sides of the double rack 610 and the arms 619 respectively are clamped to the gears 620 by the clamping washers 626. A pair of clamping screws 630, for example, extend through suitable openings in the clamping washer 626, arcuate slots 632 formed in the arms adjacent the bearing apertures 628 therein, and into threaded sockets 634 in the gears 620. When the angularity of each clamping arm 619 has been adjusted respectively relative to its gear 620, the clamping bolts 630 are tightened to lock the clamping arms 619 in said positions relative to said gears.

When the downward movement of the sub-ram 594 and rack 610 initially is interrupted by clamping engagement of the arms 618 with the leads of the component, said rack becomes relatively stationary and continued downward movement of ram 576 carries the clamping arms 619 and gears 620 therewith. Such continued movement effects rotation of gears 620 and the arms 619 are moved in opposite rotary directions from the initial position thereof shown in FIGURES 39 and 47, to the final bending position thereof shown in FIGURE 48. As has been stated above, downward movement of the sub-ram 594 and rack 610 not only is limited by engagement of the clamping arms 614 with the leads of the components but, particularly for purposes of preventing such clamping from deforming said leads due possibly to excess clamping, the locking thumb nuts 608 may be adjusted very precisely to control such downward movement accurately.

From FIGURE 50 particularly, it will be seen that the lower extremities of the bending arms 619 are provided with shoes 636 which are bent at a right angle to the arms 619 and respectively are provided with oppositely directed, lead engaging grooves 638 so that when the arms 619 are moving from the position shown in FIGURE 47 to that shown in FIGURE 48, the grooves 638 will wipe along the leads and insure accurate bending thereof into parallel relationship, assuming the outer surfaces of anvil blades 572 are parallel to each other, as clearly shown in FIGURE 48. Obviously, it will be seen that the disposition of the outer surfaces of anvil blades 572 relative to each other controls the spacing between and angle of the bent leads 28 and 32 relative to the axis of the components 20. Although FIGURES 48 and 49 do not show terminals applied to the outer ends of said leads, it will be understood that terminals will be fixed to the ends thereof due to having been applied thereto by the terminal applying mechanism described above.

It is to be understood, of course, that in the event only trimming of the leads to accurate lengths and bending thereof into precise desired shape is all that is required for the components, without affixing terminals to the ends of the leads, the present machine can be adjusted to produce such a product by suitably varying the control means, for example, such as by maintaining the switches 474 closed. Under such circumstances, the die blocks 346 continuously reciprocate to operate the movable shearing blades 398 and the index wheels continuously move stepwise to advance the components along the path therefor.

Further, it will be understood that in the event the shape desired for the leads 28 and 32 on the component as shown in FIGURE 48 is not as illustrated, it is within the purview of the invention that the outer surfaces of the anvil blades 572 and the cooperating surfaces of shoes 636 on the bending arms 619 may be modified to produce a relatively wide variety of different shapes, irregular bends, crenellations and otherwise, in said leads, especially if the movement of the bending arms 619 is regulated so that the shoes 636 properly may cooperate with the outer surfaces of anvil blades 572 to effect such shaping.

After the leads 28 and 32 of each component have been bent by the bending arms 619 and anvil blades 572 to the desired shape, as the components 20 are presented sequentially to said bending means, the second half of the cycle of operation of the bending mechanism 38 takes place. This involves the commencement of upward movement of the ram 576 which initially rotates the bending arms 619 away from the bent leads, the spring 604 holding the rack 610 momentarily stationary to accomplish this. As soon as continued upward movement of ram 576 has progressed to where the sub-ram 594 also commences to move upwardly, then the component upon the anvil blade 572 is released by clamping arms 614, whereupon the retracting movement of the horizontal ram 526 commences so as slidably to remove the anvil blades 572 from beneath the shaped component 20. To insure that the ram 526 and the anvil blades 572 will be completely removed from beneath the component 20, as shown in FIGURE 49, a stripping blade 640 which is fixed to the forward edge of and extends upwardly from plate 564 at a slight slope as shown in FIGURE 49, is engaged by the body of the component 20 to prevent retracting movement thereof while the anvil blades 572 continue to retract completely from beneath the body. Then, the component drops by gravity as shown in the relative positions in FIGURE 49 indicated respectively by broken and full lines. The shaped components either may be transferred to suitable machines for further operations, a receptacle, conveyor belt, or otherwise, as desired. At this stage, the complete functions of the machine comprising the present invention have been completed and the desired product has been formed.

It will be understood that the retracting cycle of the horizontal ram 526 and anvil blades 572 is controlled by the inlet of actuating fluid to the cylinder 528 as controlled by valve 542 and actuating cam 544, whereupon the force of the fluid acting between the piston and outer end of cylinder 528 overcomes the force of the internal spring within the cylinder and the forces of the auxiliary springs 576 to effect the desired retraction.

Referring to the circuit diagram in FIGURE 51, details of the various switches and other elements embodied in said circuit, including the motor 210, have been explained in various degrees of detail hereinabove. It will be understood, of course, that said circuit primarily is exemplary inasmuch as the same may be varied to suit convenience. However, if desired, an overload relay unit diagrammatically illustrated and indicated 642 may be incorporated in the circuit between the line conduit 644 and motor 210. Such overload relay is supplementary to the main control switch 472 by which the motor is started and stopped, as desired, by an operator. The overload relay 642, of course, functions automatically and may be one of a number of available commercial types.

For the foregoing, it will be seen that the component handling and lead tipping machine embodying the present invention is capable of extensive adjustment to adapt the same to handle components of uniform sizes of bodies and lengths and diameter of leads but the machine quickly and easily may be adjusted to handle components having a different size of body and different length or diameter of leads. Further, the machine may be adjusted to bend to desired shape either one or both of said leads and apply terminals to the ends of one or both of said leads. The entire machine functions automatically from the operation of sequentially and longitudinally feeding said components from a random mass thereof in a hopper, through all cycles of operation and functions of the machine to produce a desired component product having one or both of the leads tipped with a terminal and the leads bent to desired shape.

Numerous fool-proof features are embodied in the machine to provide safety to the various operating mechanisms thereof and to insure a uniform product, without normally requiring any manual operation of any kind. Further, due to the design and arrangement of certain units of mechanisms in the machine and the manner in which they function, the machine is capable of shaping components of very delicate natures and small sizes, as well as relatively large components of a much more rugged nature, and a full range of sizes therebetween.

Still further, although the exemplary illustration and description of the machine embodied in this application primarily have been concerned with the shaping of a component having a single lead projecting longitudinally from the opposite ends thereof, and substantially axially of a cylindrical body, it is to be understood that the machine, with suitable relatively simple adaptation, can be utilized to apply terminals to the ends of and bend the leads of components which, for example, have at least one terminal projecting from one end of the body and a plurality of preferably parallel terminals projecting from the other or both ends of the body of the components and yet be handled by the machine for purposes of applying terminals to certain or all of said leads after trimming the same to precise lengths and also bending some or all of said leads to desired shape.

In the event, for example, a plurality of terminals project from one or both ends of the body of the components, it, of course, will be necessary to provide a plurality of terminal feeding means at one or both sides of the path of movement of the components and the terminal applying dies will have to be designed, for example, so as the apply a plurality of terminals simultaneously to said plurality of leads. In this regard, the lead bending mechanism 38 also would have to be modified to the extent of providing adequate grooves or clearance spaces in the shoes 636 of the bending arms 619 as required, but such a modification is feasible and within the purview of the invention as described and claimed herein.

While the invention has been described and illustrated in its several preferred embodiments, and has included certain details, it should be understood that the invention is not to be limited to the precise details herein illustrated and described since the same may be carried out in other ways falling within the scope of the invention as claimed.

We claim:

1. A machine for arranging and feeding in sequence electrical components having leads projecting from opposite ends thereof and affixing terminals to at least one of said leads and bending at least one of said leads into a predetermined shape, said machine comprising in combination, means operable to receive a batch supply of such components and arrange and feed the same sequentially in predetermined position from said means, means operable in timed relationship with said arranging means to receive said components sequentially from said arranging means and support and move said components sequentially along a predetermined path to a terminal applying station in said machine, terminal applying means operable at said station to affix a terminal to at least one of said leads of each component, means operable to feed terminals sequentially to said terminal applying means, means controlling the operation of said terminal feeding means and including actuating means engageable by said components during movement thereof to said terminal applying station to initiate operation of said feeding means, and lead forming means operable in timed relationship to the movement of said component receiving and supporting means to receive components therefrom and bend at least one of said leads of each component to a predetermined shape and discharge such shaped components from said machine, said lead forming means including a bending anvil, a guideway to said anvil extending into the path of movement of the components and transfer means operable to shift the components from said path along the guideway.

2. A machine for arranging and feeding in sequence electrical components having leads projecting from opposite ends thereof and affixing terminals to the tip of at least one of said leads and bending at least one of said leads into a predetermined shape, said machine comprising in combination, means operable to arrange a batch supply of such components and feed the same in timed sequence and predetermined position from said means, rotary carrier means operable in timed relationship with said arranging means to receive the leads of said components to support said components and move said components sequentially to a terminal applying station, means operable at said station to affix a terminal to at least one of said leads of each component, means operable to feed terminals sequentially to said terminal applying means in timed relationship with the movement of components to said applying means, means controlling the actuation of said terminal feeding means and including a member positioned so as to be engageable by a lead of the component as moved to said applying means and movable by said lead to effect actuation of said terminal feeding means, and means operable in timed relationship to the movement of said rotary carrier means to remove components therefrom after passing said terminal applying station and bend at least one of said leads of each component to a predetermined shape and discharge such shaped components from said machine.

3. A machine for arranging and sequentially feeding electrical components having leads projecting from opposite ends thereof and affixing terminals to the tip of said leads and bending said leads into a predetermined shape, said machine comprising in combination, means operable to arrange a random oriented supply of such components into predetermined position and feed the same in arranged sequence from said means, means operable in timed relationship with said arranging means to receive said components sequentially from said arranging means and support said components for sequential movement transversely of their longitudinal axes with their leads exposed to a terminal applying station in said machine, blade means preceding said terminal applying station in the path of movement of said components and operable to trim the exposed component leads to a predetermined length, terminal applying means including a reciprocable ram at said station operable to affix terminals to the trimmed leads, said blade means including a reciprocable cutting element connected to and movable with said ram, and means operable in timed relationship to the movement of said component receiving and moving means to receive components therefrom and bend said leads of each component to a predetermined shape and discharge such shaped components from said machine.

4. A machine for arranging and feeding in sequence electrical components having leads projecting from opposite ends thereof and affixing terminals to the tip of said leads and bending said leads into a predetermined shape, said machine comprising in combination, means operable to receive and support said components for movement thereof transversely to their longitudinal axes along a predetermined path, means operable in timed relationship to said receiving and supporting means to arrange a random oriented supply of such components in sequential order and feed the same in sequence to said receiving and supporting means, terminal applying means positioned adjacent the path of movement of said components and operable to affix a terminal to said leads of each component, means operable to feed a strip of terminals to said applying means, means operable in timed relationship to the movement of said component receiving and supporting means to receive therefrom components after application of said terminals and bend said leads of each component to a predetermined shape and discharge such shaped components therefrom, power means interconnected to and operable to drive said aforementioned means of said machine in timed relationship to each other, and control means for said power means having a sensing element engageable by said strip of terminals and operable upon disengagement of said sensing element to stop said power means and the machine upon said feeding of said strip becoming impeded or exhausted.

5. A machine for arranging and feeding in sequence electrical components having leads projecting from opposite ends of a body to affix terminals to said leads and bend said leads to predetermined shape, said machine comprising a base, carrier means including a pair of spaced members adjustable relative to each other toward and away from a central point on said base and operable to receive therebetween the bodies of said components and respectively engage the leads of said components to support and move said components along a predetermined path, means on said base in alignment with said central point and operable in timed relationship with said carrier means to arrange and feed components thereto, terminal applying means positioned along the path of said components and operable to affix a terminal to at least one of said leads of each component in timed relationship to the movement of said supporting means, and discharge means on said base in alignment with said central point and operable in timed relationship to the movement of said carrier means to remove the components sequentially therefrom, said discharge means including bending means to shape and space the component leads for insertion into apertures of a printed circuit board.

6. A machine for arranging and feeding in sequence electrical components having leads projecting from opposite ends of a body to affix terminals to said leads and bend said leads to predetermined shape, said machine comprising in combination, carrier means including a pair of spaced rotary members adjustable relative to each other and operable to receive therebetween the bodies of said components and respectively engage the leads of said components to support and move said components along a predetermined path with the ends of the leads laterally projecting from said members, means operable in timed relationship with said supporting means to arrange and feed components from a random oriented batch sequentially to the supporting means with the component bodies positioned between said spaced members, terminal applying means adjustably positioned laterally relative to said spaced members and operable to affix terminals at a predetermined position on said leads of each component in timed relationship to the movement thereof by said supporting means, and lead forming means including a bending anvil operable in timed relationship to the movement of said rotary members to shift the components laterally of said path off said carrier means onto said anvil and to bend the leads of each component to a predetermined shape.

7. A machine for arranging and feeding in sequence electrical components having leads projecting from opposite ends of a body to affix terminals to said leads and bend said leads to predetermined shapes, said machine comprising a base, carrier means including a pair of spaced members adjustable toward and from each other from a central point on said base and operable to receive therebetween the bodies of said components and respectively receive the leads of said components to support and move said components transversely to their longitudinal axes along a predetermined path, means on said base in alignment with said central point operable in timed relationship with said supporting means to arrange and feed components sequentially thereto, trimming means adjustably positioned laterally and exteriorly of said spaced members and operable to trim the ends of said leads to desired predetermined lengths, terminal applying means positioned respectively adjacent opposite sides of the path of movement of said components by said supporting members and adjustable laterally thereto, said applying means being operable to affix terminals respectively to said trimmed leads thereof in timed relationship to the movement of said supporting means, and means on said base in alignment with said central point operable in timed relationship to the movements of said carrier means to remove the components therefrom and to bend said leads thereof to predetermined shapes.

8. A machine for arranging and feeding in sequence electrical components having leads projecting from opposite ends thereof and affixing terminals to the tip of said leads and bending said leads into a predetermined shape, said machine comprising in combination, means operable to receive the leads of said components to support and move the same transversely to their longitudinal axes sequentially to a terminal applying station, means operable to arrange a random oriented supply of such components in sequential order and feed the same in sequence to said receiving and supporting means in timed relationship to the movement of the same, terminal applying means operable at said station to affix a terminal to said leads of each component, transfer means operable in timed relationship to the movement of said component supporting means to receive and clamp the leads of said components after application of terminals thereto, and means operable to bend said leads of each component into a predetermined shape while said leads are so clamped, said transfer means including clamping elements projecting into the path of movement of the components and defining a component guideway, said transfer means being operable to shift the components from said path along said guideway to the bending means.

9. A machine for preparing electrical components having leads projecting from opposite ends for mounting on a printed circuit board comprising carrier means operative to support and move the components transversely to their longitudinal axes with the leads exposed sequentially to a terminal applying station, means operative to arrange a random oriented batch of components in sequential order and to deliver the components in sequence to said carrier means in timed relation to the movement thereof, terminal applying means operable at said station to affix terminals to the exposed leads, and discharge means operable in timed relation to the movement of said carrier means to remove the components sequentially therefrom, said discharge means including bending means to shape and space the component leads for insertion into apertures of the printed circuit board.

10. A machine for preparing electrical components having leads projecting from opposite ends for mounting on a printed circuit board comprising carrier means operative to support and move the components transversely to their longitudinal axes with the leads exposed sequentially to a terminal applying station, terminal applying means operable at said station to affix terminals to the exposed leads, and discharge means operable in timed relation to the movement of said carrier means to remove the components sequentially therefrom, said discharge means including a guideway and bending means to shape and space the component leads for insertion into apertures of the printed circuit board, said guideway including a first guideway portion projecting in the path of movement of the components and a second guideway portion reciprocably mounted adjacent said first portion into and out of said path and operative when in said path to confine the components to movement off said carrier to said bending means.

References Cited in the file of this patent

UNITED STATES PATENTS

| | | |
|---|---|---|
| 2,238,921 | Waldsmith | Apr. 22, 1941 |
| 2,340,448 | Andren | Feb. 1, 1944 |
| 2,592,019 | Farnette | Apr. 8, 1952 |
| 2,748,388 | Cardani | June 5, 1956 |
| 2,768,425 | Andren | Oct. 30, 1956 |
| 2,777,477 | Zimmerman | Jan. 15, 1957 |
| 2,848,718 | Hancock | Aug. 26, 1958 |
| 2,855,113 | Roske | Oct. 7, 1958 |
| 2,897,870 | Berg | Aug. 4, 1959 |
| 2,904,786 | Hazel | Sept. 22, 1959 |